United States Patent
Wang et al.

(10) Patent No.: US 11,772,640 B2
(45) Date of Patent: Oct. 3, 2023

(54) SYSTEMS AND METHODS FOR VEHICULAR COLLISION DETECTION BASED ON MULTI-DIMENSIONAL COLLISION MODELS

(71) Applicant: Verizon Patent and Licensing Inc., Basking Ridge, NJ (US)

(72) Inventors: Boyu Wang, Menlo Park, CA (US); Sujoy Bhattacharjee, San Jose, CA (US); Naveed Farooqui, Sunnyvale, CA (US); Nick G. Suizo, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 160 days.

(21) Appl. No.: 17/221,135

(22) Filed: Apr. 2, 2021

(65) Prior Publication Data
US 2022/0314971 A1 Oct. 6, 2022

(51) Int. Cl.
*B60W 30/09* (2012.01)
*B60W 30/16* (2020.01)
(Continued)

(52) U.S. Cl.
CPC ............ *B60W 30/09* (2013.01); *B60W 30/16* (2013.01); *B60W 40/04* (2013.01); *B60W 50/14* (2013.01);
(Continued)

(58) Field of Classification Search
CPC ...... B60W 30/09; B60W 30/16; B60W 40/04; B60W 50/14; B60W 2554/406; B60W 2554/80; B60W 2554/4049; B60W 2050/143; B60W 2050/146; G06F 18/2411; G06F 18/23213
See application file for complete search history.

(56) References Cited

U.S. PATENT DOCUMENTS

| 2015/0120138 A1* | 4/2015 | Zeng | ..................... G01S 13/931 701/41 |
| 2021/0009121 A1* | 1/2021 | Oboril | ............... B60W 50/0097 |
| 2022/0080962 A1* | 3/2022 | Bin-Nun | ........... B60W 30/0956 |

OTHER PUBLICATIONS

James M. Fleming, Craig K. Allison, Xingda Yan, Roberto Lot, Neville A. Stanton, "Adaptive Driver Modelling in ADAS to Improve User Acceptance: A Study Using Naturalistic Data", Oct. 10, 2019, Safety Science, vol. 119 (Year: 2019).*

* cited by examiner

*Primary Examiner* — Dale W Hilgendorf
*Assistant Examiner* — Hana Lee

(57) ABSTRACT

A system described herein may generate one or more models based on relationship data associated with multiple objects. The models may include one or more thresholds (e.g., which may indicate potential collisions between objects). The system may compare relationship data, associated with a particular vehicle and a particular object, with the one or more thresholds associated with the one or more models, and determine whether the relationship data associated with the particular vehicle and the particular object is rare data with respect to the one or more models. When the relationship data associated with the particular vehicle and the particular object is not rare data, the system may refraining from causing the particular vehicle to perform a collision prevention measure, and when the relationship data associated with the particular vehicle and the particular object is rare data, the system may cause the particular vehicle to perform the collision prevention measure.

20 Claims, 12 Drawing Sheets

(51) Int. Cl.
  *B60W 40/04* (2006.01)
  *B60W 50/14* (2020.01)
  *G06F 18/2411* (2023.01)
  *G06F 18/23213* (2023.01)
(52) U.S. Cl.
  CPC .... *G06F 18/23213* (2023.01); *G06F 18/2411* (2023.01); *B60W 2050/143* (2013.01); *B60W 2050/146* (2013.01); *B60W 2554/406* (2020.02); *B60W 2554/4049* (2020.02); *B60W 2554/80* (2020.02)

SYSTEMS AND METHODS FOR VEHICULAR COLLISION DETECTION BASED ON MULTI-DIMENSIONAL COLLISION MODELS

BACKGROUND

Internet of Things ("IoT") devices, Machine-to-Machine ("M2M") devices, or the like, may be deployed in various regions in order to provide services such as autonomous vehicles, smart lighting fixtures, or other such services. Autonomous vehicles may, for example, make use of sensor data in order to identify objects, road signs, or other features and may make use of models in order to determine how to respond to such objects, road signs, etc. For example, autonomous vehicles may effect lane changes, speed changes, brake actuations, or other actions based on detected road features as well as one or more models.

DETAILED DESCRIPTION OF EXAMPLE EMBODIMENTS

Figure 1:
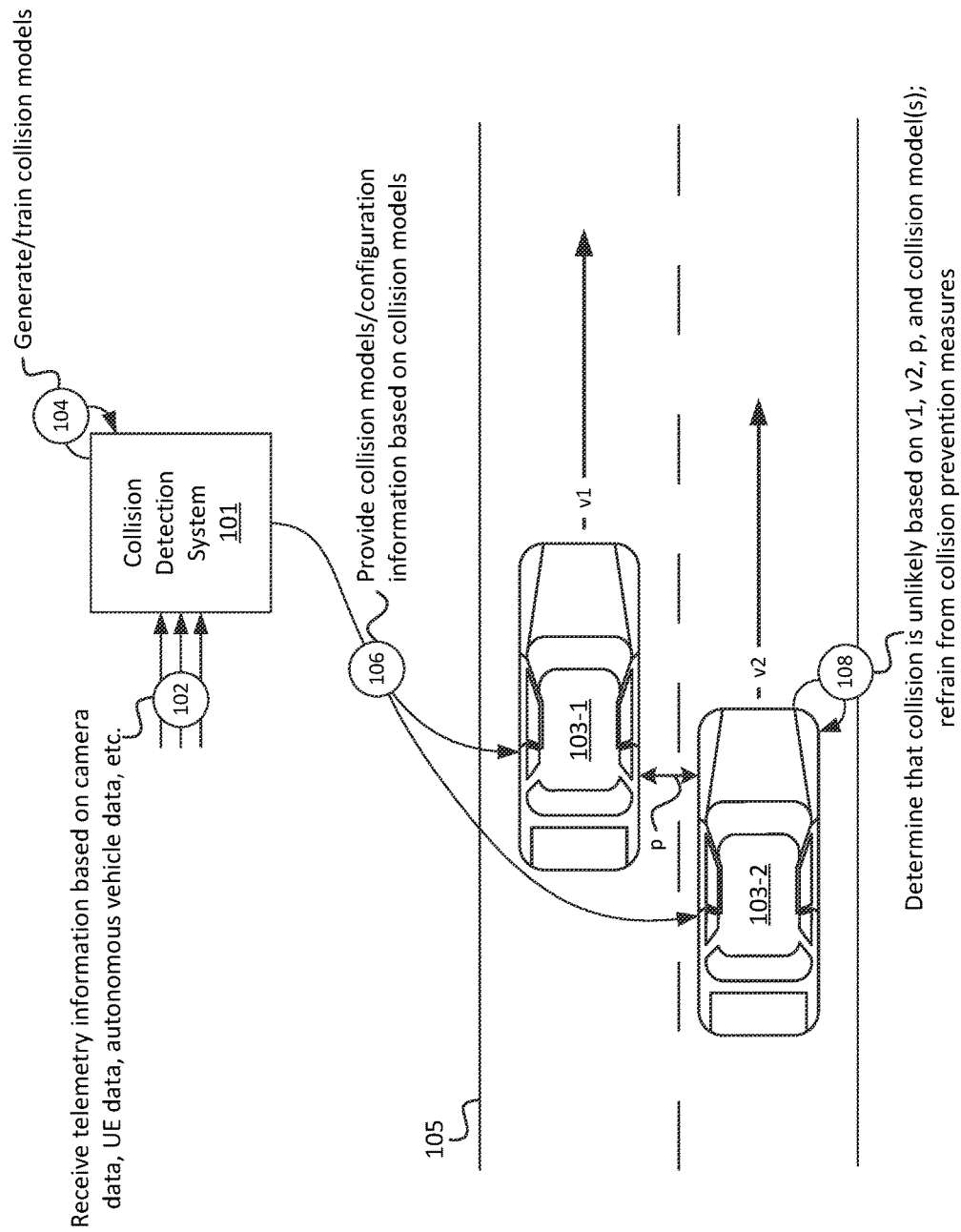
FIG. 1 illustrates an example overview of one or more embodiments described herein.

The following detailed description refers to the accompanying drawings. The same reference numbers in different drawings may identify the same or similar elements.

Embodiments described herein provide for the detection of collision events and/or near-collision events, which may involve autonomous vehicles, smart road fixtures (such as lighting fixtures), and/or other configurable devices or systems deployed in various regions. For example, a particular collision event may include two vehicles (e.g., cars, trucks, motorcycles, bicycles, scooters, etc.) colliding, a vehicle colliding with a person, and/or other events in which two or more objects (e.g., one or more moving objects) collide. A near-collision event (sometimes referred to as a "near-miss") may include a vehicle nearly colliding with another vehicle or a person, or other situations in which collision between two or more objects is imminent or is relatively likely.

Systems such as autonomous vehicles, smart road fixtures (e.g., configurable traffic lights, configurable street lamps, configurable lane coordination systems, smart crosswalk signs, etc.), and/or other suitable systems may make use of models that indicate collision events or near-collision events based on sensor or other input data, in order to avoid such events. For example, an autonomous vehicle may make use of camera data, Light Detection and Ranging ("LIDAR") data, gyroscope data, accelerometer data, Global Positioning System ("GPS") data, speedometer data, and/or other sensor data to detect telemetry features and/or road features. Telemetry features may include, for example, angle or heading, speed, acceleration, and/or other features related to the telemetry of the vehicle. Road features may include, for example, the presence of detected objects, such as other vehicles, road signs, lane dividers or other markings painted on a road, pedestrians, or the like. Road features may also include telemetry data associated with such objects, such as the position, heading, speed, etc. of another vehicle or a pedestrian. While examples are provided in the context of "objects" herein, similar concepts may apply to pedestrians (e.g., to avoid colliding with pedestrians).

Based on the data used to detect telemetry features and/or road features, as well as one or more suitable models, an autonomous vehicle may detect that a collision event or near-collision event is imminent (e.g., based on the heading, position, and/or speed of the autonomous vehicle and the heading, position, and/or speed of another object), and may take remedial measures to avoid such collision. As another example, parameters of smart lighting fixtures (e.g., smart camera devices, smart lighting devices, or the like affixed to a mount, pole, etc.) may be adjusted based on such models, such as the adjustment of traffic signal light timings such that collisions or near-collisions are reduced as compared to parameters prior to such adjustment. As yet another example, such models may be utilized during a city planning process, whereby locations of crosswalks, light fixtures, sidewalks, traffic lights, road signs, and/or other physical features may be placed in certain locations based on such models, such that such placement or other configuration may reduce the likelihood of collisions or near-collisions in an area that is proximate to such physical features.

Systems and/or methods described herein may provide for the reduction or elimination of "false positives" with respect to collisions or near-collisions. For example, embodiments described herein may make use of analytical techniques such as artificial intelligence/machine learning ("AI/ML") techniques or other suitable techniques to identify collisions or near-collisions based on a wide variety of factors. Embodiments described herein may, for example, utilize a multi-dimensional analysis to identify relatively common data sets in a relatively large quantity of dimensions, and/or may identify relatively rare data sets in the relatively large quantity of dimensions. As discussed herein, such data sets may refer to time- and/or location-keyed data that refers to the telemetry, position, and/or other attributes of vehicles and/or other objects. The multiple dimensions in the multi-dimensional analysis may refer to multiple types of telemetry or other data, such as speed, heading, geographical location, angle with respect to another object, and/or other suitable information.

As described herein, "rare" data sets may correspond to sets of data that are less common (e.g., as determined using a suitable multi-dimensional rarity analysis, as discussed below) than other data sets, and based on which collisions or near-collisions may be determined. For example, on certain roads or intersections, it may be a common occurrence for vehicles to approach each other with relatively close proximity and relatively high speed differentials (e.g., a tunnel, a narrow roadway, a two-lane road in which vehicular traffic flows in opposing directions, or the like). On the other hand, on other roads or intersections, such relatively close proximity and relatively high speed differentials may be rare. For example, such proximity and speed differentials may be rare on a highway with relatively wide lanes and on which vehicles commonly travel similar speeds. Embodiments described herein may refrain from detecting a collision or near-collision in the former example (e.g., where such proximity and speed differential data sets are more common), while detecting a near-collision in the latter example (e.g., where such proximity and speed differential data sets are more rare). As discussed below, in some embodiments, "rare" features and/or "common" features may be determined with respect to each other. For example, features that are outliers and/or vary by at least a threshold amount from a median, mean, etc. may be considered as "rare," while features that are not outliers, and/or are within a threshold of a mean, median, or other value may be considered as "common" or "not rare." In this manner, the accuracy and reliability of such collision or near-collision determination may be improved in accordance with embodiments described herein. As noted above, the enhanced determination of collisions or near-collisions may be used to improve autonomous vehicles, smart light fixtures, road planning, pedestrian safety, and/or other suitable situations.

FIG. 1 illustrates, for example, a situation in which a false alarm for a near-collision is avoided, thus avoiding the implementation of unnecessary remedial measures related to collisions or near-collisions. For example, as shown, collision detection system 101 may receive (at 102) telemetry information and/or other information, which may include telemetry data such as speed, heading, acceleration, and/or other telemetry information associated with one or more pedestrians, vehicles, and/or other objects. In the examples described herein, such objects are presented in the context of vehicles and/or pedestrians; however, in practice similar concepts may apply to other types of moving and/or stationary objects. In some embodiments, the received information (at 102) may include geographical location information associated with stationary and/or moving objects and/or pedestrians, timestamp information, and/or other suitable information.

In some embodiments, the received information (at 102) may be received from telematics and/or other suitable systems associated with vehicles (which may include autonomous vehicles, semi-autonomous vehicles, and/or non-autonomous vehicles), cameras, User Equipment ("UE") devices such as mobile telephones or other types of wireless devices, or the like. In some embodiments, the data may be collected and/or determined via one or more sensors of such devices, such as location sensors (e.g., which may include GPS circuitry and/or logic or other types of location determination capability), accelerometers, barometers, gyroscopes, and/or other types of circuitry and/or logic that are capable of determining some or all of the telemetry and/or other suitable information discussed herein in accordance with some embodiments.

In some embodiments, the received information (at 102) may be received over time, such as over a one-minute time window, a one-hour time window, a one-week time window, and/or some other suitable and configurable time window. In some embodiments, the information may include real-world information, collected and/or determined by sensors or other suitable devices or systems based on real-world occurrences. In some embodiments, the information may include simulated information, collected and/or determined by one or more devices or systems that perform suitable simulations and determine telemetry and/or other suitable information based on the simulations.

Based on the information (received at 102), collision detection system 101 may generate and/or train (at 104) one or more collision models. As described herein, a "collision model" may be a model based on which the likelihood of a collision or near-collision may be determined based on a given set of information. In some embodiments, the given set of information may include a given set of telemetry information associated with one or more vehicles, position information associated with one or more pedestrians, and/or other suitable information, as discussed below. Examples are described in greater detail about the generation and/or training of one or more collision models. Briefly, as noted above, collision detection system 101 may identify a relatively high likelihood of collisions and/or near-collisions in situations where the received telemetry information includes more rare data sets, while collision detection system 101 may identify a relatively low likelihood of collisions and/or near-collisions in situations where the received telemetry information includes more common data sets. In some embodiments, collision detection system 101 may utilize one or more other factors, in addition to or in lieu of, the generated (at 104) collision models, to detect the likelihood of a collision or near-collision. In some embodiments, collision detection system 101 may identify particular remedial actions to take (e.g., swerving, braking, outputting an alert, etc.) based on different collision models, and/or based on different sets of input data (e.g., telemetry data and/or other suitable data) provided to such models.

In some embodiments, particular collision models may be keyed to certain times and/or locations. For example, collision detection system 101 may identify that some collision models are more applicable during particular times of day. For example, some collision models are more applicable during morning and/or evening hours, than during night time or day time hours. For example, some collision models may be based on telemetry and/or other types of data that are more common when vehicles manifest certain types of driving behaviors or phenomena during morning and/or evening hours (e.g., relatively slow speeds and relatively close proximity of vehicles and/or pedestrians, which may be caused by rush hour commuting) as opposed to during night time and/or day time hours (e.g., relatively higher speeds and relatively more distant proximity of vehicles and/or pedestrians). As another example, some collision models may be based on telemetry and/or other types of data that are more common in a given geographical region (e.g., city, state, province, etc.), type of intersection (e.g., three-way intersection, four-way intersection, intersection with traffic lights, intersection with stop signs, etc.), type of road (e.g., two-lane road, four-lane road, residential road, highway, etc.), or the like than in other geographical regions, types of intersections, types of roads, etc.

As further shown, collision detection system 101 may output (at 106) the collision models to one or more devices or systems, such as autonomous and/or semi-autonomous vehicles, smart lighting fixtures, smart traffic control fixtures, UEs, workstations, administration and/or city planning systems, and/or other suitable devices or systems. In some embodiments, the collision models may be "pushed" to such systems (e.g., in the absence of, or independent of, any requests for such models from such systems), such as during an Over-the-Air ("OTA") update process, a provisioning and/or configuration process, or some other suitable process. In some embodiments, collision detection system 101 may provide collision models, associated with a particular region, to one or more devices or systems that are within the particular region or are approaching (e.g., are within a threshold distance of, and/or are approaching at least at a threshold speed) the particular region. In some embodiments, autonomous vehicles, smart road fixtures, UEs, etc. may request (e.g., via an application programming interface ("API"), a portal, and/or some other suitable communication interface) collision models from collision detection system 101, based on which collision detection system 101 may provide (at 106) the generated collision models.

In the example here, two vehicles 103 (i.e., vehicles 103-1 and 103-2) may receive one or more collision models. For example, vehicles 103 may be part of an OTA "campaign" or other distribution process of the collision models, may receive the collision models based on location (e.g., based on entering or approaching a geographical region with which the collision models are associated, as discussed above), and/or may otherwise receive the collision models. For example, vehicles 103 may include communication circuitry and/or logic such as one or more wireless radios (e.g., Long-Term Evolution ("LTE") radios, Fifth Generation ("5G") radios, and/or other types of wireless radios) that are capable of communicating with collision detection system 101 via one or more networks, such as a LTE RAN, a 5G RAN, a satellite network, and/or some other type of RAN. As noted above, vehicles 103 may request (e.g., "pull") the collision models from collision detection system 101 via an API or other suitable communication pathway, and/or may receive such models from collision detection system 101 (e.g., such models may be "pushed") without a specific request from vehicles 103. That is, arrows 106 shown in FIG. 1 may correspond to a time prior to vehicles 103 traveling on road 105, and/or may be sent to vehicles 103 while vehicles 103 are traveling on road 105.

As further shown, vehicles 103 may travel along road 105 at a particular time. For example, vehicle 103-1 may travel at a first velocity ("v1") and vehicle 103-2 may travel at a second velocity ("v2"). Further, at the particular time, vehicle 103-1 and vehicle 103-2 may have a particular proximity ("p") between them. As used herein, "proximity" may refer to the distance between one object (e.g., a vehicle, a pedestrian, a road feature, etc.) and another.

In some embodiments, vehicles 103 (e.g., vehicle 103-1 and/or vehicle 103-2) may measure their own velocity using one or more suitable sensors, such as speedometers, wheel speed sensors, or the like. In some embodiments, vehicles 103 (e.g., vehicle 103-1 and/or vehicle 103-2) may measure or estimate the velocity of the other vehicle 103 based on LIDAR, camera data, and/or other suitable sensors or detection techniques. Further, vehicles 103 (e.g., vehicle 103-1 and/or vehicle 103-2) may measure or estimate the proximity between vehicles 103 based on LIDAR, camera data, and/or other suitable sensors or detection techniques. In some embodiments, vehicles 103 may measure or estimate the respective velocities v1 or v2 and/or proximity p based on information received (e.g., via a wireless network) from one or more other sources, such as a roadside camera system, a drone-mounted sensor system, and/or some other suitable external device or system that is capable of determining and/or estimating such information. While velocity and proximity are used as examples, in practice, additional, fewer, and/or different information (e.g., acceleration of vehicle 103-1 and/or vehicle 103-2, relative acceleration associated with vehicles 103-1 and 103-2, angle between vehicles 103-1 and 103-2, presence of road markings or road signs within a threshold proximity of vehicles 103-1 and/or 103-2, and/or other factors) may be used in accordance with embodiments described herein.

As further shown, vehicle 103-1 and/or vehicle 103-2 may utilize the one or more collision models to determine, based on velocities v1 and/or v2 (e.g., the individual velocities and/or a relative velocity that is based on a difference between v1 and v2), proximityp, and/or one or more other factors, whether a collision or near-collision between vehicles 103-1 and vehicle 103-2 is imminent. In the example here, vehicle 103-2 may identify (at 108) that a collision between vehicles 103-1 and vehicle 103-2 is unlikely. For example, vehicle 103-2 may determine, based on one or more collision models, that the relative velocity between vehicles 103-1 and 103-2 is less than a threshold difference, that one or both of velocities v1 and v2 are below a threshold velocity, and/or that proximity p is greater than a threshold proximity. In some embodiments, and as discussed further below, the collision models may be multi-dimensional models, where different values for certain types of information (e.g., velocities v1 and/or v2, and/or a relative velocity based on velocities v1 and/or v2) may be associated with different thresholds for other types of information (e.g., proximity p).

Based on determining (at 108) that a collision is unlikely between vehicles 103-1 and 103-2, vehicle 103-2 may refrain from enacting one or more collision prevention measures. As discussed below, in some embodiments, vehicle 103-2 (and/or some other suitable device or system communicatively coupled to vehicle 103-2) may make such a determination based on calculating a score or other measure of likelihood of a collision or near-collision. For example, vehicle 103-2 may calculate such a score on an ongoing and/or continuous basis, in order to determine in real time or near-real time whether to enact collision prevention measures. In this example, vehicle 103-2 may refrain from swerving away from vehicle 103-1, may refrain from braking, may refrain from outputting a "crash detection" alert or other type of driver alert, or from enacting other collision prevention measures.

Figure 2A:
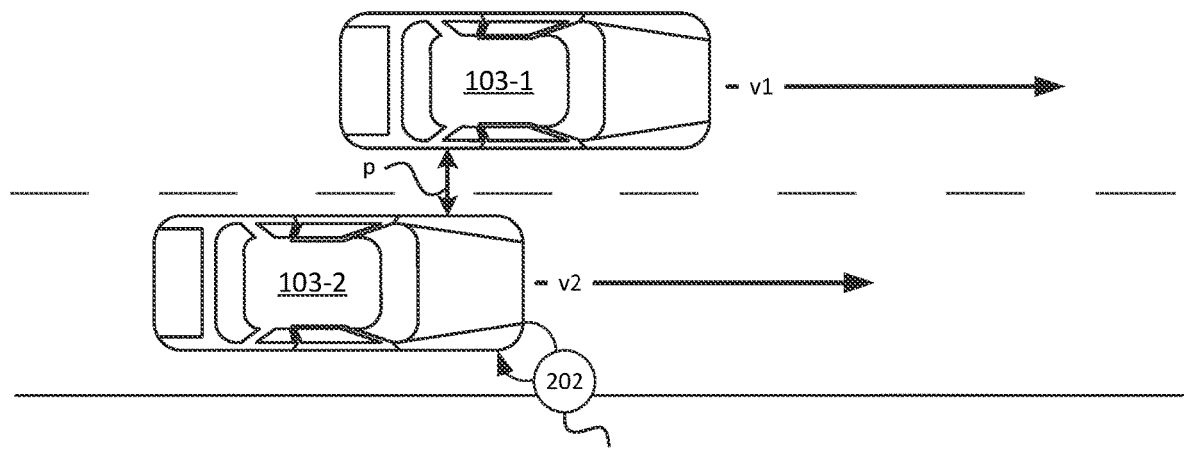
FIGS. 2A and 2B illustrate an example situation in which a potentially unnecessary collision avoidance measure is taken.
Figure 2B:
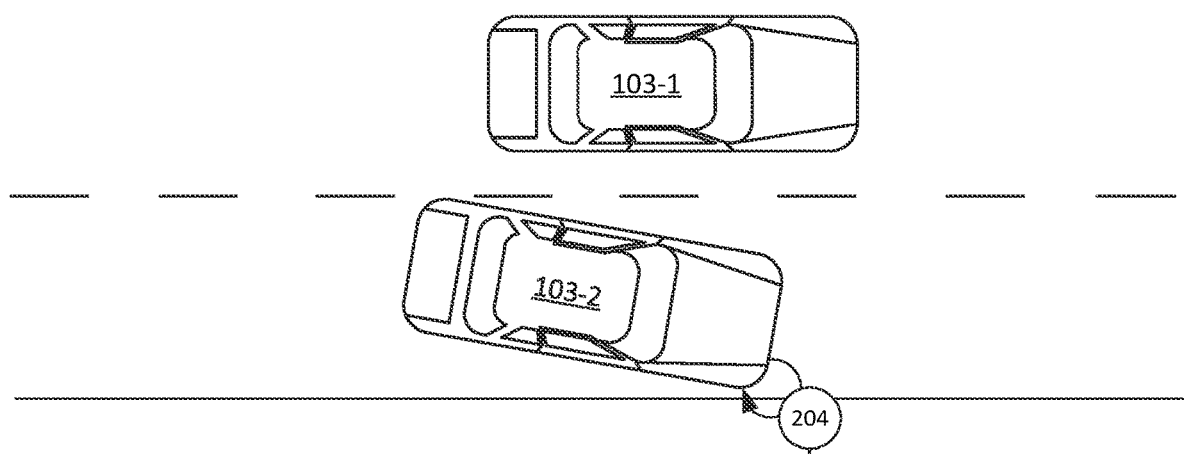

FIGS. 2A and 2B illustrate an example situation that may occur in the absence of concepts described above with respect to FIG. 1 (e.g., without the use of collision models, as described above). As shown in FIG. 2A, for example, vehicle 103-2 may identify (at 202) a potential collision based on velocities v1 and/or v2 and/or proximity p. For example, such identification may be based on static configuration parameters which may be applied in any situation, including on a highway, on a residential street, and/or in other situations.

As shown in FIG. 2B, based on identifying the potential collision, vehicle 103-2 may enact (at 204) collision prevention measures. For example, vehicle 103-2 may swerve, brake, output a driver alert (e.g., via an alert output system associated with the vehicle, such as a display screen, speakers, etc.), and/or other suitable measures. In certain situations, such as the example situation shown in FIG. 2B, such collision prevention measures may be inappropriate and/or may lead to unsafe conditions, as the identification of such potential collisions may be unsuitable for the specific situation. For example, in the examples of FIGS. 1, 2A, and 2B, vehicles 103-1 and 103-2 may be traveling along a relatively straight road 105, with relatively little or no likelihood of collision. Such circumstances may be taken into account by use of the collision models as shown in FIG. 1, whereas such circumstances may not necessarily be taken into account in the examples of FIGS. 2A and 2B where the present embodiments are not used.

Figure 3:
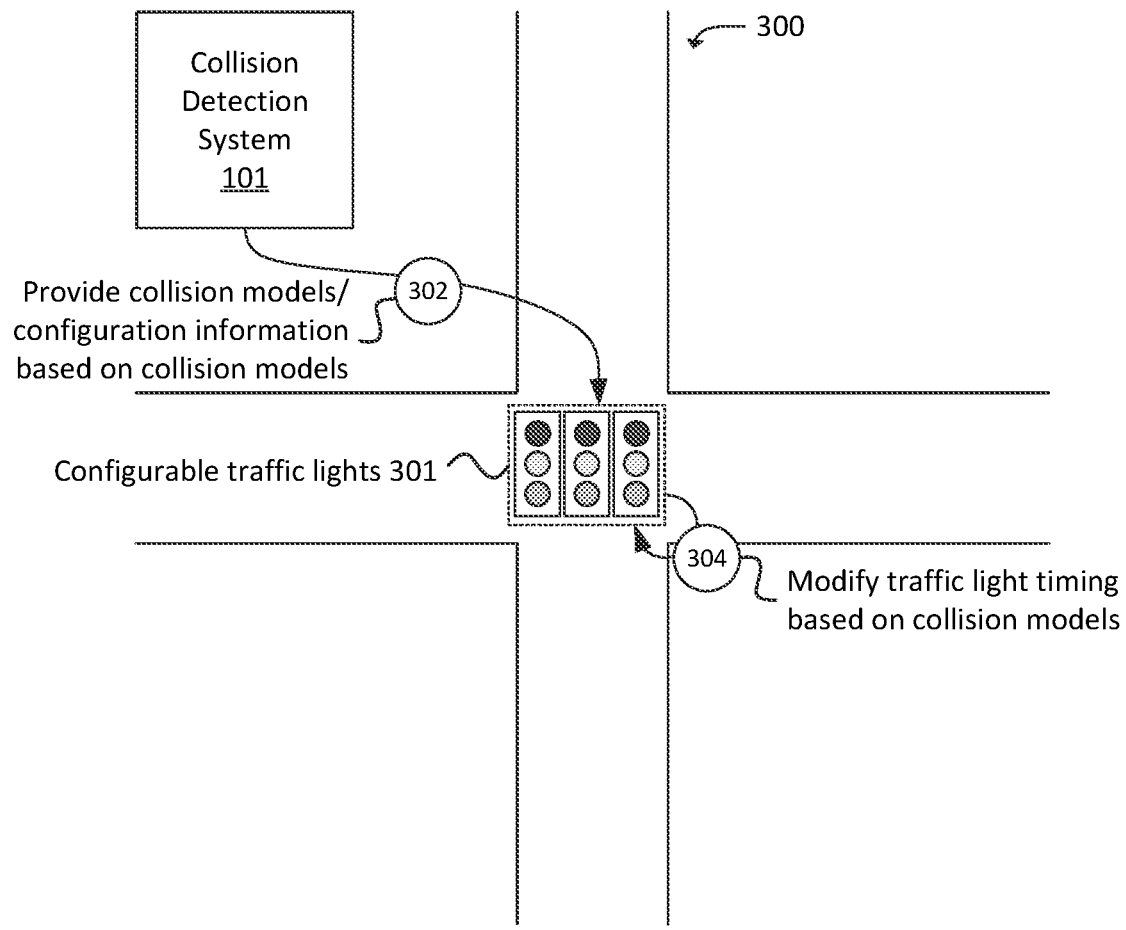
FIG. 3 illustrates an example configuration of configurable traffic lights in accordance with one or more embodiments described herein.

FIG. 3 illustrates another example situation in which collision models may be used to enhance the safety of a road, intersection, and/or other region. For example, as shown, intersection 300 may include a set of configurable traffic lights 301, which may be communicatively coupled to collision detection system 101 via a network, such as a RAN, a wired network, and/or some other type of network. Configurable traffic lights 301 may be configurable inasmuch as timings of the display of different traffic signals (e.g., red light, yellow light, green light, one or more arrows, and/or other indicators) may be configurable by collision detection system 101 and/or some other device or system.

In some embodiments, collision detection system 101 may output (at 302) one or more collision models to configurable traffic lights 301. Such models may include, for example, collision models associated with a geographical region in which intersection 300 is located, collision models associated with intersections or roads with similar characteristics of intersection 300, collision models associated with a particular time of day, and/or collision models otherwise selected for intersection 300. Additionally, or alternatively, collision detection system 101 or some other device or system may determine configuration information, such as traffic light timings, based on such collision models.

Based on the received collision models and/or configuration information generated based on such collision models, configurable traffic lights 301 may modify (at 304) traffic light timings. For example, the collision models may be used to identify that current parameters associated with configurable traffic lights 301, such as traffic light timings implemented prior to the receipt of the collision models and/or configuration information, may be associated with a relatively high likelihood of collisions. Configurable traffic lights 301 may modify (at 304) traffic light timings may receive collision (at 302) models on an ongoing basis, such as a periodic basis, an intermittent basis, and/or some other ongoing basis. Further, configurable traffic lights 301 may modify (at 304) traffic light timings on an ongoing basis, based on the collision models received on the ongoing basis, in order to refine the traffic light timings based on up-to-date collision models. In some embodiments, the collision models may be associated with traffic light timings (e.g., for intersections having similar attributes as intersection 300, such as a same or similar number lanes, a same or similar number of intersecting roads, a same or similar amount of traffic, etc.) for which fewer collisions or near-collisions are likely based on a modified traffic light timing. In this manner, the safety of intersection 300 may be improved by modifying traffic light timings based on collision models.

Figure 4:
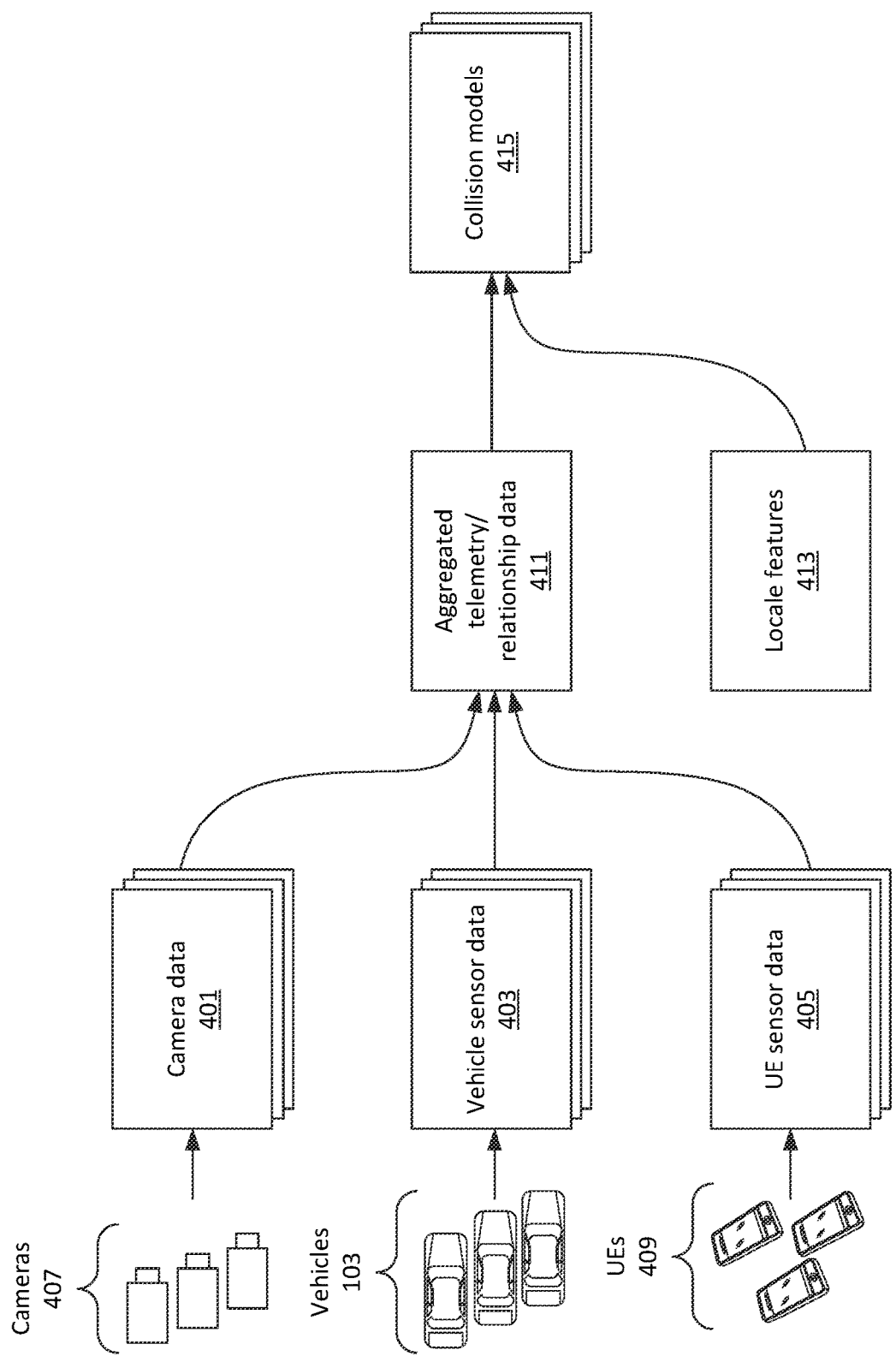
FIG. 4 illustrates example data sources based on which one or more collision models may be generated, in accordance with one or more embodiments described herein.

FIG. 4 illustrates an example of information that may be used to generate one or more collision models. For example, as discussed above, collision detection system 101 may receive camera data 401, vehicle sensor data 403, and UE sensor data 405. In some embodiments, collision detection system 101 may receive additional data, less data, and/or different data than the example shown in FIG. 4. In some embodiments, some or all of camera data 401, vehicle sensor data 403, and/or UE sensor data 405 may be received by collision detection system 101 from one or more devices or systems that serve as an interface, clearinghouse, processing system, application server, and/or other intermediary device or system for respective camera data 401, vehicle sensor data 403, and/or UE sensor data 405.

In some embodiments, collision detection system 101 may receive camera data 401, as captured by one or more cameras 407. Cameras 407 may be, may include, may be communicatively coupled to, etc. one or more roadside cameras, vehicle-mounted cameras, cameras integrated in other devices such as mobile phones, and/or other types of cameras. Camera data 401 may include still image data and/or video data. In some embodiments, camera data 401 may be processed data generated by and/or received from one or more other devices or systems, such as devices or systems that perform image recognition techniques, computer vision techniques, and/or other suitable techniques by which objects may be identified and tracked in camera data 401, and/or attributes of such objects may be identified and tracked. Camera data 401 may also include, and/or be annotated with, location data indicating a geographical location, angle, etc. of a respective camera 407 that captured respective camera data 401, and/or a geographical location of one or more objects depicted in camera data 401. In some embodiments, camera data 401 may include, and/or be annotated with, time data indicating a time at which particular camera data 401 was captured by a respective camera 407.

Vehicle sensor data 403 may include and/or be based on sensor measurements and/or readings taken by one or more sensors associated with respective vehicles 103. As noted above, such sensors may include, for example, LIDAR sensors, speed sensors, accelerometers, gyroscopes, cameras, microphones, barometers, location sensors, and/or other types of sensors. In some embodiments, vehicle sensor data 403 may include raw data (e.g., raw sensor measurements) and/or processed data based on sensor readings (e.g., impact detection, braking detection, angle between a respective vehicle 103 and another object, distance between a respective vehicle 103 and another object, or the like). In some embodiments, the raw data may be communicated via one or more suitable protocols, such as Message Queuing Telemetry Transport ("MQTT"), Constrained Application Protocol ("CoAP"), Extensible Messaging and Presence Protocol ("XMPP"), and/or some other suitable protocol. Vehicle sensor data 403 may also include, and/or be annotated with, location data indicating a geographical location, angle, etc. of a respective vehicle 103 that captured respective vehicle sensor data 403. In some embodiments, vehicle sensor data 403 may include, and/or be annotated with, time data indicating a time at which particular vehicle sensor data 403 was determined or measured by vehicle 103.

UE sensor data 405 may include and/or be based on sensor measurements and/or readings taken by one or more sensors associated with respective User Equipment ("UEs") 409. UEs 409 may include, for example, one or more smart phones, tablets, laptop computers, workstations, Internet of Things ("IoT") devices, Machine-to-Machine ("M2M") devices, and/or some other suitable type of device or system. In some embodiments, UEs 409 may include one or more sensors, such as one or more accelerometers, gyroscopes, cameras, microphones, barometers, location sensors, and/or other types of sensors. In some embodiments, UE sensor data 405 may include raw data (e.g., raw sensor measurements) and/or processed data based on sensor readings (e.g., impact detection, braking detection, angle between a respective vehicle 103 and another object, distance between a respective vehicle 103 and another object, or the like). In some embodiments, such processed data may include relationship data, indicating a relationship between the position, telemetry, and/or other data associated with vehicle 103 and one or more other objects.

Based on camera data 401, vehicle sensor data 403, and UE sensor data 405, collision detection system 101 may generate aggregated telemetry/relationship data 411. For example, separately received camera data 401, vehicle sensor data 403, and/or UE sensor data 405 may depict the same times and/or locations, based on which collision detection system 101 may identify a holistic set of aggregated telemetry/relationship data 411 associated with such times and/or locations. As one example, particular camera data 401 may depict vehicles 103-1 and 103-2 on road 105 at a given time (e.g., a particular time window, such as a 30-second window, a two-minute window, etc.), vehicle sensor data 403 may include data from vehicles 103-1 and/or 103-2 at the given time, and UE sensor data 405 may include measurements taken by UEs 409 that were within vehicles 103-1 and 103-2. Aggregated telemetry/relationship data 411 may thus include an aggregated set of data that indicates telemetry information associated with vehicles 103, as determined based on camera data 401, vehicle sensor data 403, and/or UE sensor data 405. In some embodiments, aggregated telemetry/relationship data 411 may include multi-dimensional data, such as data correlating factors such as speed of vehicles 103, relative speed between multiple vehicles 103 and/or other objects (e.g., a difference in speed between vehicles 103 and/or other objects), acceleration of vehicles 103, relative acceleration between multiple vehicles 103, angle and/or heading of vehicles 103, relative angle and/or heading between multiple vehicles 103 and/or other objects, and/or other factors.

Collision detection system 101 may further receive information regarding locale features 413, which collision detection system 101 may associate with times and/or locations indicated by camera data 401, vehicle sensor data 403, UE sensor data 405, and/or aggregated telemetry/relationship data 411, in order to determine one or more time- and/or location-based collision models 415. Locale features 413 may include information indicating attributes and/or features of geographical area. For example, locale features 413 may include information relating to attributes of roads, such as quantity of lanes, vehicular traffic volume, type of intersection, classification (e.g., highway, residential, school zone, etc.), speed limit, road slope, road curve radius, location and/or size of crosswalks, and/or other suitable attributes. In some embodiments, locale features 413 may include building layout and/or density, topographical features (e.g., mountains, valleys, forests, streams, etc.), weather-related information, air quality-related information (e.g., smog density, particulate density, fog density, etc.), and/or other factors that may affect driving conditions and/or vehicular or pedestrian safety. Locale features 413 may include geographical coordinates (e.g., latitude and longitude coordinates, GPS coordinates, or the like) or other suitable location information, to indicate the geographical locations of respective features.

Based on aggregated telemetry/relationship data 411 and, in some embodiments, locale features 413, collision detection system 101 may generate one or more collision models 415 that indicate features, data sets, and/or thresholds based on which collisions or near-collisions may be likely. For example, as noted above and as discussed below, "rare" data sets may be identified, where such "rare" data sets are associated with factors that are more likely to be associated with collisions or near-collisions than less rare data sets.

For example, a particular collision model 415 may be associated with a particular time and/or location, and/or with a particular set of locale features 413. In this manner, while certain types of driving behavior may be acceptable or safe in certain conditions (e.g., on certain roads, in certain geographical locations, on roads with a particular quantity of lanes, at certain times of the day, etc.), the same type of driving behavior may be unacceptable, unsafe, and/or more likely to cause collisions in other conditions.

Figure 5:
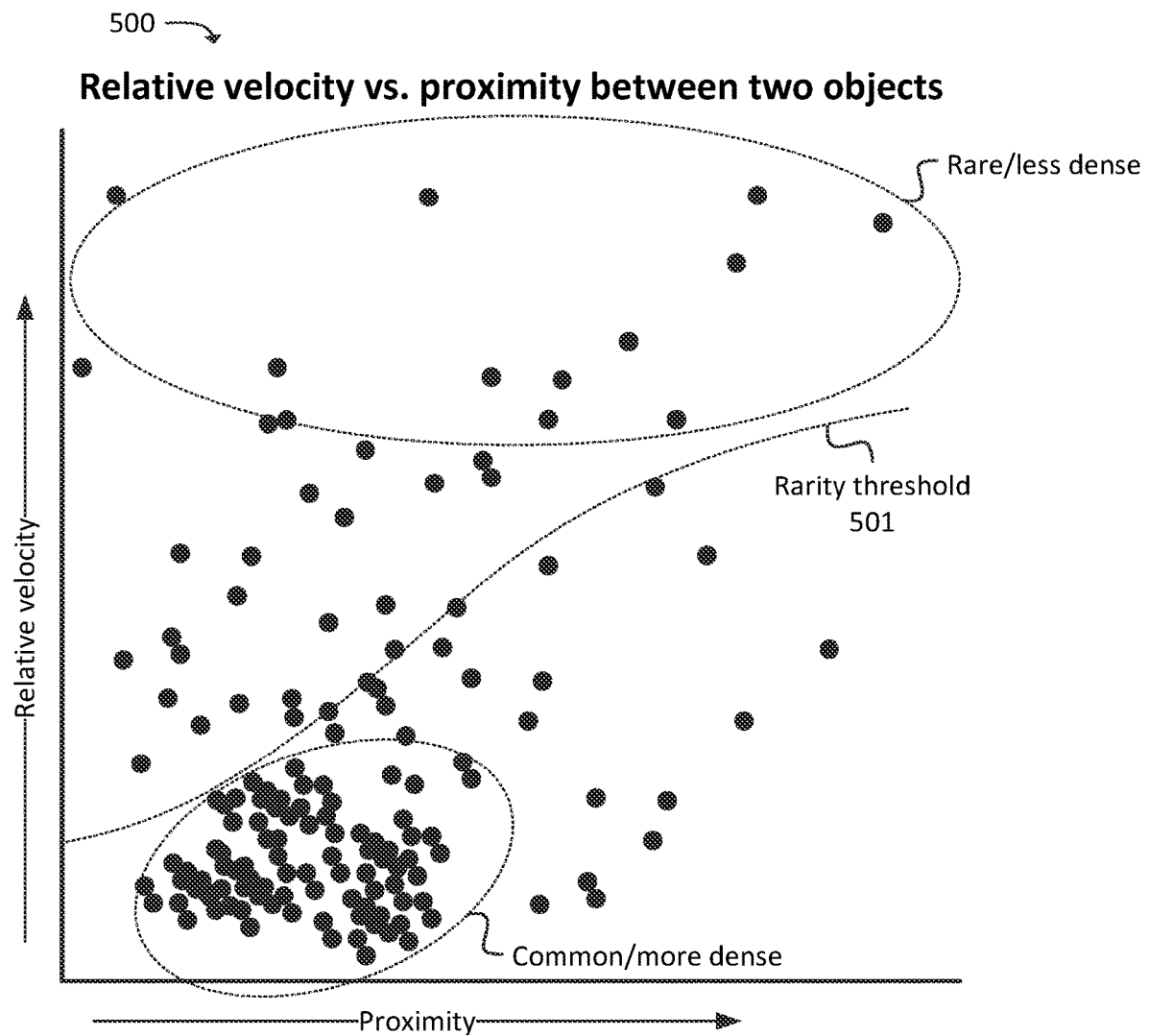
FIGS. 5-8 illustrate example techniques by which potential collisions may be identified based on multi-dimensional data sets, in accordance with one or more embodiments described herein.

As shown in FIG. 5, graph 500 may include a group of data sets, where each point in graph 500 represents a particular data set. Such data sets may also be referred to as "data features" or simply as "features." For example, one particular data set or feature may indicate a particular relative velocity between two objects (e.g., between two vehicles 103, between vehicle 103 and another object, and/or two different objects), as well as a proximity between the two objects at the same time and/or within a particular time window associated with the particular relative velocity. While data sets or features here are shown in terms of two dimensions (e.g., relative velocity and proximity), in practice, similar concepts may be applied in three or more dimensions, where each data set or feature may be based on three or more factors (e.g., three or more of relative velocity, proximity, relative angle, relative acceleration, and/or other factors).

Collision detection system 101 may identify features that are rare or are outliers with respect to other features. For example, as depicted in graph 500, a relatively large quantity of features may be concentrated or dense (e.g., less rare) at the lower left of graph 500 (e.g., lower/closer proximity and lower relative velocity), and may be less concentrated or dense (e.g., more rare) at other portions of graph 500 (e.g., lower/closer proximity and higher relative velocity, higher/farther proximity and higher relative velocity, and/or lower/closer proximity and lower relative velocity). Generally, features that are relatively more dense may indicate that corresponding data is more likely to occur in "normal" (e.g., non-collision) situations, and therefore is unlikely to correspond to a collision or near-collision. On the other hand, more rare features may be less likely to occur in "normal" situations, and therefore may be likely to correspond to collisions or near-collisions. In some embodiments, collision detection system 101 may utilize one or more anomaly detection techniques, such as Density-Based Spatial Clustering of Applications with Noise ("DBSCAN"), Support Vector Machines ("SVM"), and/or other suitable techniques to identify rare or common features.

In some embodiments, collision detection system 101 may identify rarity threshold 501, which may be a "best fit" line or curve, and/or which may otherwise be used to classify rare or common features. While shown as a curve in FIG. 5, in practice, rarity threshold 501 may be a straight line and/or some other shape or polygon. In some embodiments, rarity threshold 501 may be determined based on one type of data, and/or may be more heavily weighted toward one type of data than another. For example, rarity threshold 501 may be determined based on rare values for relative velocity, without taking proximity into account. In some embodiments, rarity threshold 501 may be determined based on rare values for relative velocity and proximity equally. In some embodiments, rarity threshold 501 may be determined based on rare values for relative velocity and proximity, where the rarity of velocity data is weighted differently from the rarity of proximity data.

Generally, the determination of rarity threshold 501 may be tailored to situations that are more likely to be associated with a collision or near-collision. For example, although a feature with relatively high proximity and a relatively high relative velocity may be relatively rare, such feature may not be associated with a situation in which a collision is likely to occur. For example, two vehicles 103 that are traveling at greatly different velocities (e.g., 10 km/h and 100 km/h) may be unlikely to collide if they are relatively far apart (e.g., 500 meters apart). On the other hand, two vehicles 103 that are traveling at moderately different velocities (e.g., 10 km/h and 20 km/h) may be more likely to collide if they are relatively close to each other (e.g., 10 meters apart).

The information shown in graph 500 may be used to generate one or more collision models 415. For example, a particular collision model 415 may be generated based on rarity threshold 501. Thus, in situations where a given vehicle 103 and/or another object are associated with features (e.g., relative velocity and proximity) that are above rarity threshold 501, collision model 415 may indicate and/or may be used to determine that vehicle 103 is likely to be involved in a collision or near-collision, and vehicle 103 may take appropriate remedial measures. On the other hand, in situations where a given vehicle 103 and/or another object are not associated with features that are above rarity threshold 501, collision model 415 may indicate and/or may be used to determine that vehicle 103 is unlikely to be involved in a collision or near-collision, and vehicle 103 may refrain from inappropriately taking remedial measures.

In some embodiments, multiple rarity thresholds may be used to identify rare features. In this manner, a bounded region may be used (e.g., in graph 500 and/or in another representation, such as one or more three-dimensional or multi-dimensional plots) to define rare features, based on which a collision or near-collision may be detected. Further, while FIG. 5 illustrates an example of rarity threshold 501 being determined based on multiple features (e.g., a curve determined based on relative velocities and proximities of objects), in some embodiments, rarity thresholds may be determined based on more features (e.g., three or more features) or fewer features (e.g., a single feature).

Figure 6:
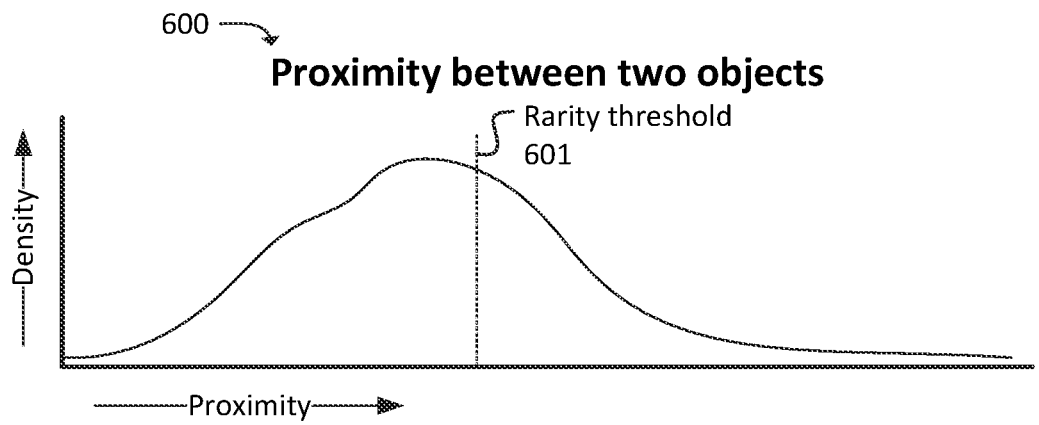

FIG. 6 illustrates an example determination of a particular rarity threshold 601 based on a one-dimension analysis (e.g., based on a single feature). In this example, graph 600 indicates a distribution of proximity values (e.g., as indicated by aggregated telemetry/relationship data 411), where higher values on the Y-axis indicate greater density of a given proximity value. For example, aggregated telemetry/relationship data 411 may indicate that more objects were detected as being within a given proximity of each other when the "density" for that proximity is higher, and may indicate that fewer objects were detected as being within another proximity of each other when the "density" for that proximity is lower. In some embodiments, collision detection system 101 may determine rarity threshold 601 using a clustering analysis, K-means analysis, Dynamic Programming-based K-Means ("DP KMeans") analysis, and/or other suitable analysis in order to identify rare values of proximity.

Figure 7:
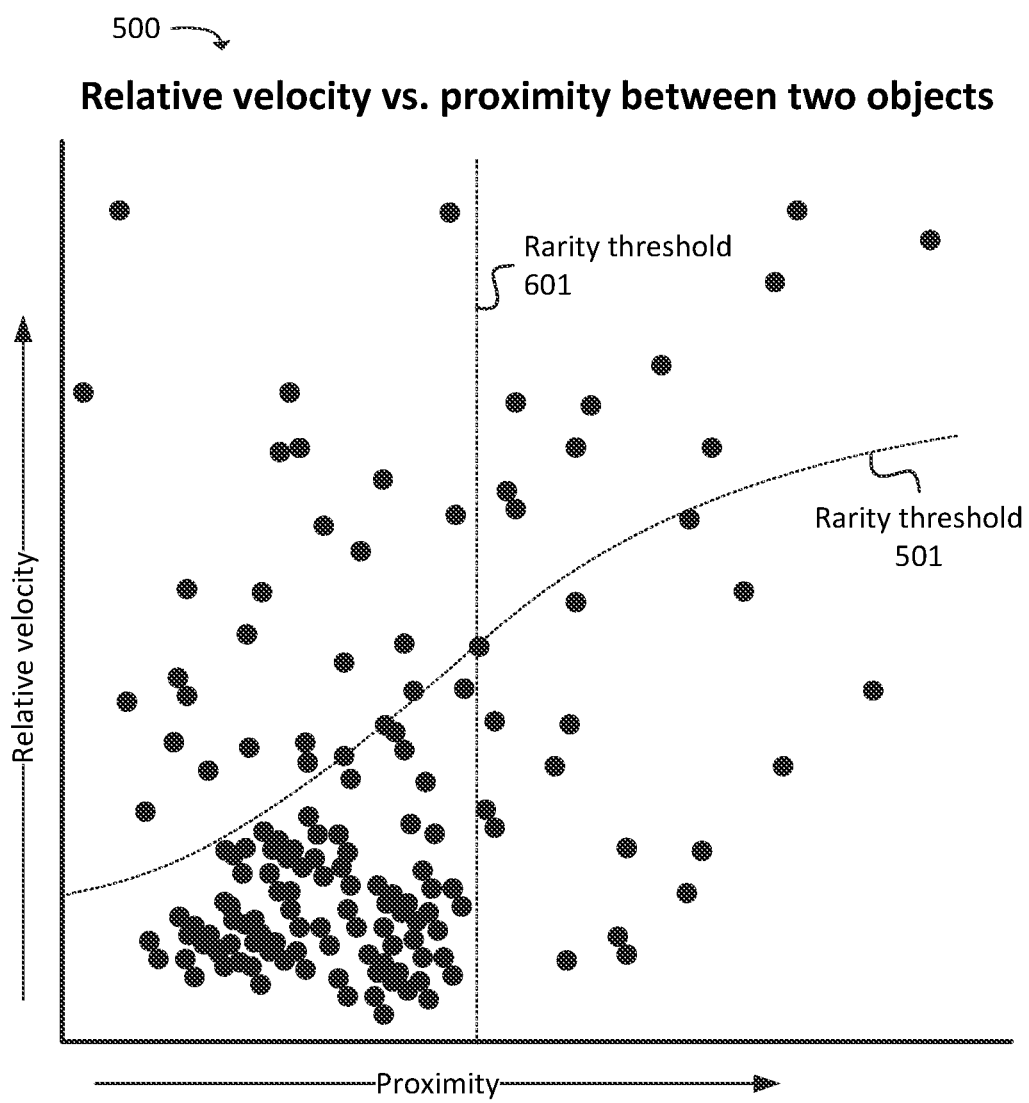

As shown in FIG. 7, rarity threshold 601 may be used in conjunction with rarity threshold 501 to define one or more regions on graph 500. For example, as shown, four regions may be defined by rarity threshold 501 and rarity threshold 601, where the regions may indicate varying levels of rarity of relative velocity values, proximity values, and/or features that are a combination of relative velocity and proximity. While shown in two dimensions in FIG. 7, similar concepts may apply in three or more dimensions. For example, multiple rarity thresholds, for multiple types of features, may be used to define multiple regions indicating varying levels of rarity and/or relationships to particular thresholds.

Figure 8:
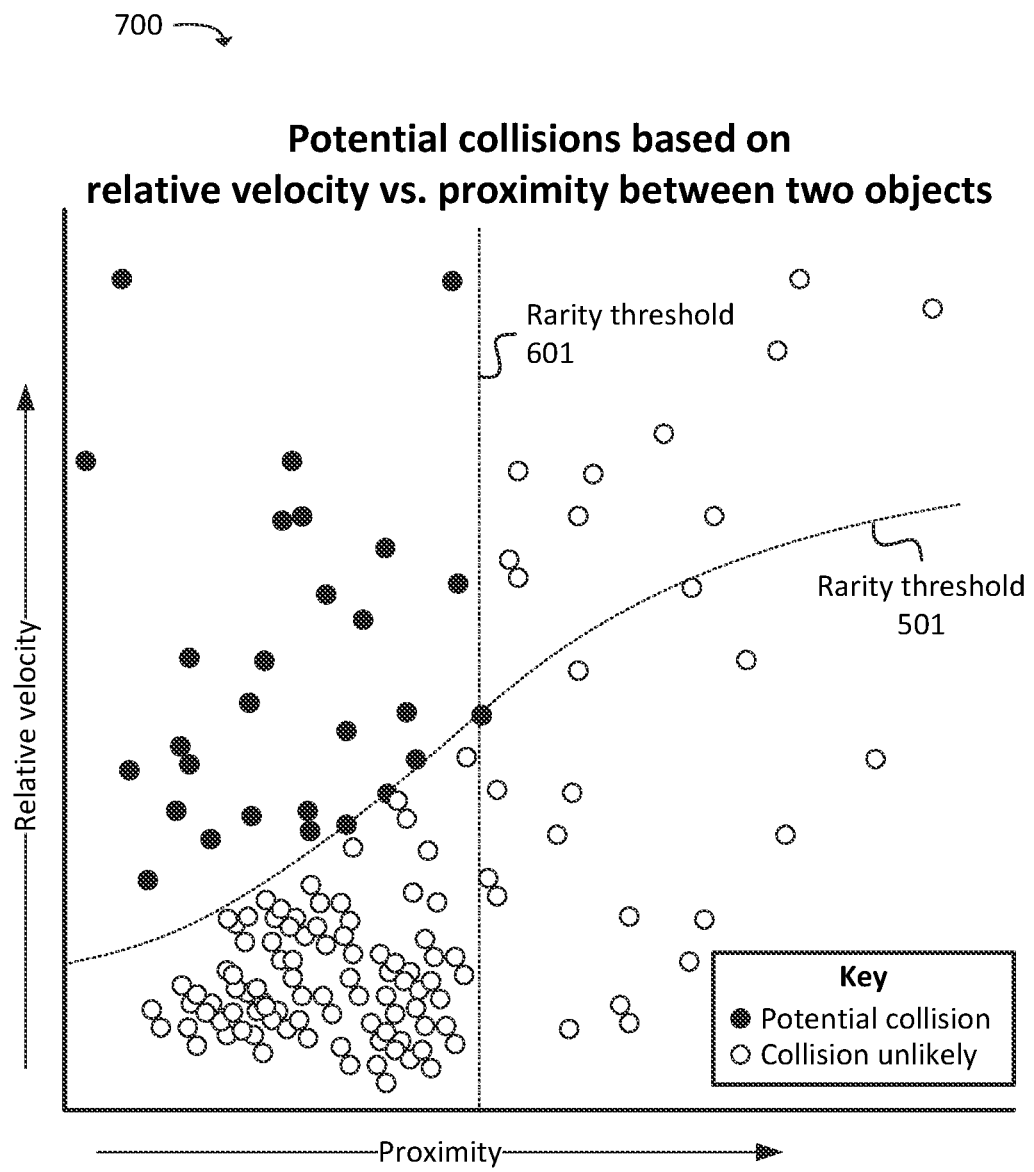

As noted above, the relationship of a particular data set or feature to one or more rarity thresholds may be used to determine whether such data set or feature is associated with a collision or near-collision. For example, in FIG. 8, features within a particular boundary formed by rarity thresholds 501 and 601 may be associated with potential collisions, while features outside of such boundary may not be associated with potential collisions. For example, features that are both above rarity threshold 501 and to the left of rarity threshold 601 may be identified as potential collisions or potential near-collisions, while features outside of such region may be identified as not associated with collisions.

As similarly described above, the features to the left of rarity threshold 601 (e.g., lower than rarity threshold 601) may be identified as potential collisions, and/or features to the right of rarity threshold 601 (e.g., greater than rarity threshold 601) may be excluded as potential collisions. For example, if two objects are greater than a particular distance (e.g., a distance associated with rarity threshold 601) from each other, it may be unlikely that such objects would collide, regardless of their relative velocities.

Figure 9:
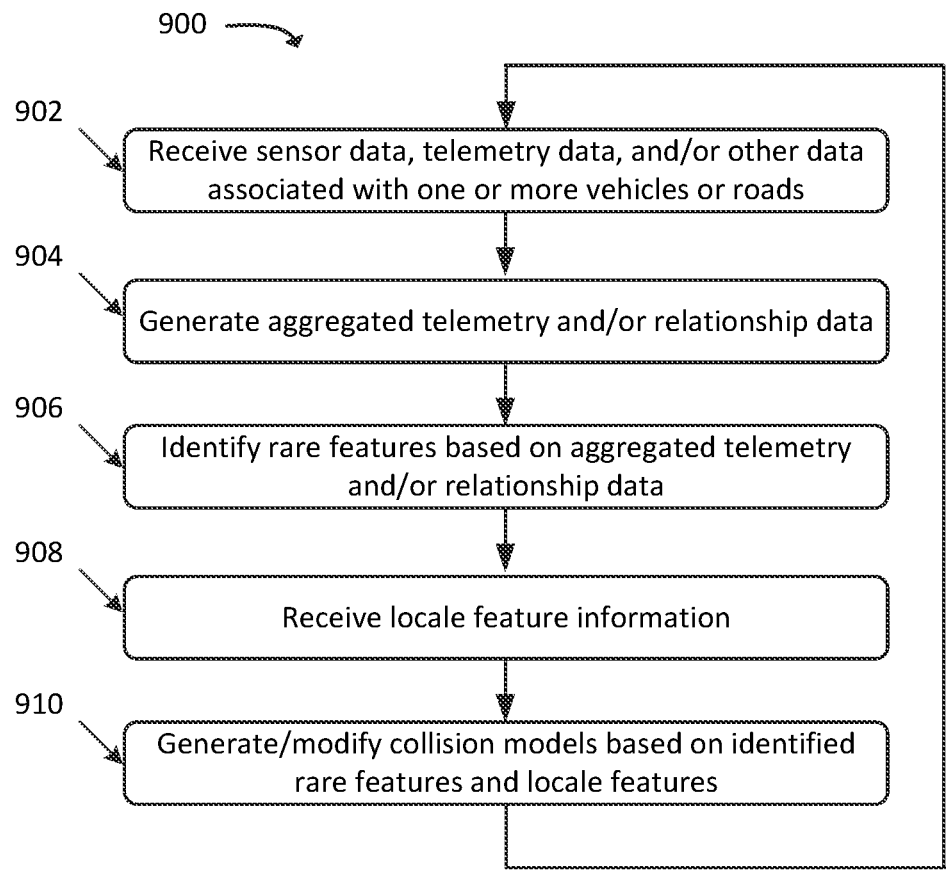
FIG. 9 illustrates an example process for detecting potential collisions between objects, in accordance with some embodiments.

FIG. 9 illustrates an example process generating and/or modifying collision models in accordance with embodiments described herein. In some embodiments, some or all of process 900 may be performed by collision detection system 101. In some embodiments, one or more other devices may perform some or all of process 900 (e.g., in concert with, and/or in lieu of, collision detection system 101).

As shown, process 900 may include receiving (at 902) sensor data, telemetry data, and/or data associated with one or more vehicles and/or roads. For example, as discussed above, collision detection system 101 may receive camera data 401, vehicle sensor data 403, UE sensor data 405, and/or other suitable data which is associated with and/or which describes the movement and/or positioning of vehicles and/or other objects on or near (e.g., within a threshold distance of) one or more roads.

Process 900 may further include generating (at 904) aggregated telemetry and/or relationship data. For example, as discussed above, collision detection system 101 may generate aggregated telemetry/relationship data 411. For example, aggregated telemetry data may include data received from multiple sources regarding a particular vehicle or other object, such as camera data depicting a particular vehicle 103 as well as sensor data from vehicle 103 itself. Aggregated relationship data may include, for example, data describing relative positioning, speed, angles, etc. between vehicle 103 and one or more other objects (e.g., another vehicle 103, a pedestrian, a curb, a median, etc.).

Process 900 may additionally include identifying (at 906) rare features based on the aggregated telemetry and/or relationship data. For example, as discussed above, collision detection system 101 may perform a clustering analysis, a regression analysis, a correlation analysis, and/or some other suitable analysis on one-dimensional and/or multi-dimensional data sets associated with or derived from aggregated telemetry/relationship data 411.

Process 900 may also include receiving (at 908) locale feature information. For example, as discussed above, collision detection system 101 may receive locale features 413, describing attributes associated with times, locations, road attributes (e.g., speed limit, slope, crosswalk attributes, etc.), vehicle attributes (e.g., make, model, size, etc.), and/or other attributes based on which different instances of aggregated telemetry/relationship data 411 may be grouped, clustered, etc. For example, as discussed above, traffic behavior may be different at certain times of the day, at certain geographical locations, etc.

Process 900 may further include generating and/or modifying (at 910) one or more collision models based on the identified rare features and the locale features. For example, as discussed above, collision detection system 101 may determine one or more thresholds that separate rare features from less rare features. In some embodiments, such thresholds may be modified or determined based on AI/ML, techniques or other suitable techniques. In some embodiments, as discussed above, collision models 415 may be keyed to certain locations, times, road attributes, vehicle attributes, and/or other locale features 413.

In some embodiments, some or all of process 900 may be repeated iteratively and/or on an ongoing basis. In this manner, collision models 415 may continue to be refined over time, thus yielding more accurate collision models 415 based on updated information.

Figure 10:
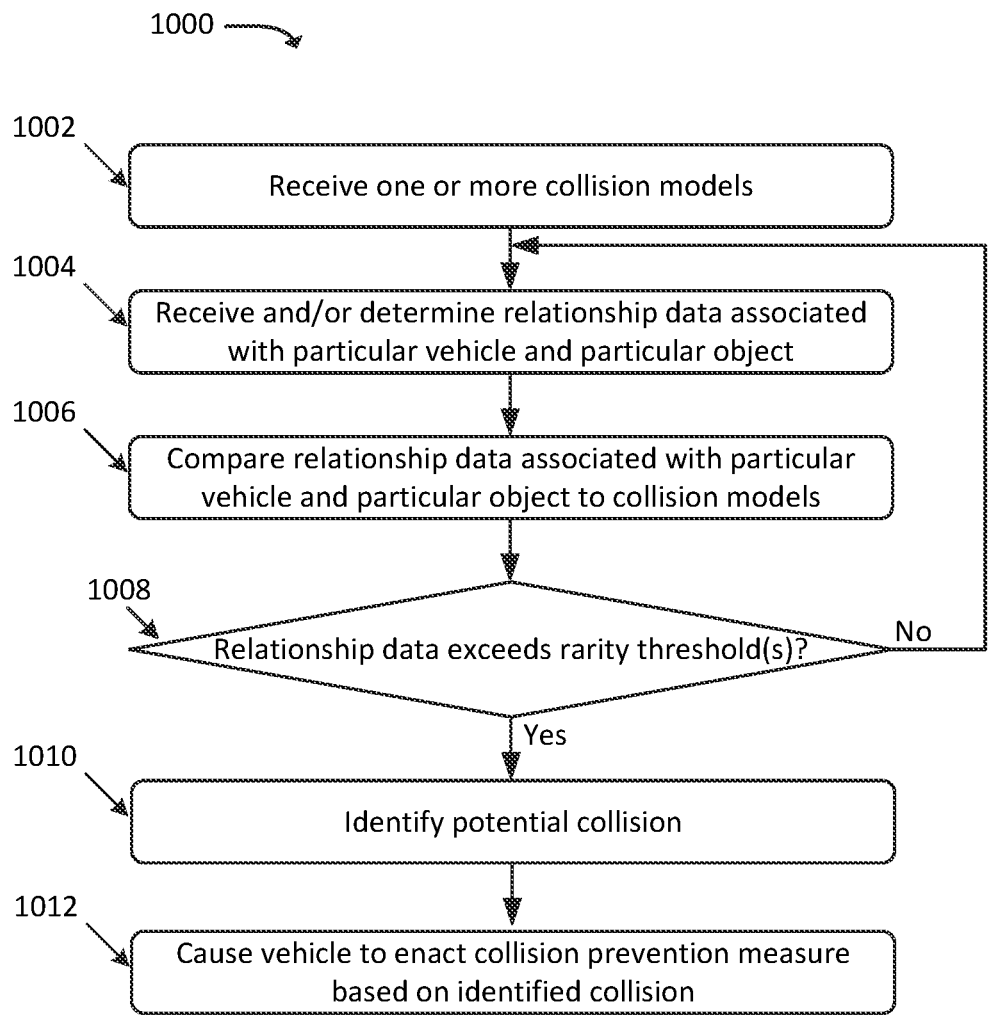
FIG. 10 illustrates an example process 1000 for utilizing a collision model to detect and avoid a potential collision, in accordance with some embodiments.

FIG. 10 illustrates an example process 1000 for utilizing a collision model to detect and avoid a potential collision. In some embodiments, some or all of process 1000 may be performed by vehicle 103. In some embodiments, one or more other devices may perform some or all of process 1000 in concert with, and/or in lieu of, vehicle 103 (e.g., by collision detection system 101 and/or some other device or system that communicates with collision detection system 101 and/or vehicle 103).

As shown, process 1000 may include receiving (at 1002) one or more collision models. For example, as discussed above, vehicle 103 may receive one or more collision models 415 as part of a configuration and/or provisioning process, an OTA update, from a UE 409 that is communicatively coupled to vehicle 103 (e.g., via an infotainment and/or communication system associated with vehicle 103), and/or as part of some other distribution process. In some embodiments, vehicle 103 may receive one or more collision models 415 associated with a geographical location in which vehicle 103 is present and/or is approaching, associated with a present or future time (e.g., within a threshold amount of time from a present time), associated with a same make or model as vehicle 103, and/or based on other suitable locale features 413.

Process 1000 may further include receiving and/or determining (at 1004) relationship data associated with vehicle 103 and a particular object. For example, vehicle 103 may utilize one or more sensors associated with vehicle 103, and/or may receive data from one or more external sources (e.g., one or more UEs 409, one or more cameras 407, or some other source) based on which vehicle 103 may determine a proximity, relative velocity, relative acceleration, relative angle, relative jolt, etc. associated with another object, such as another vehicle 103, a pedestrian, a road feature, etc.

Process 1000 may additionally include comparing (at 1006) the relationship data associated with vehicle 103 and the particular object to the received one or more collision models 415. As noted above, the collision models 415 may include one or more one-dimensional thresholds associated with particular features relationship data, and/or multi-dimensional thresholds associated with multiple features of relationship data, that may be compared to the relationship data associated with vehicle 103.

If the relationship data exceeds the one or more thresholds (at 1008—YES), then process 1000 may include identifying (at 1010) a potential collision between vehicle 103 and the particular object. For example, as discussed above, the multi-dimensional thresholds may define one or more data bounds, within which particular relationship data associated with vehicle 103 and the particular object may be rare or not rare (e.g., common).

As noted above, rare data may be indicative of collisions or near collisions. As further noted above, rare data that exceeds certain thresholds may be indicative of collisions or near collisions, while rare data that does not exceed certain thresholds may not be indicative of collisions or near collisions. Additionally, or alternatively, rare data that does not exceed certain thresholds may be indicative of collisions or near collisions, while rare data that exceeds certain thresholds may not be indicative of collisions or near collisions. For example, two objects that have a high relative speed and a high proximity may be a rare event (e.g., a data set or feature that reflects the high relative speed and high proximity), but may not be indicative of a potential collision. For example, the proximity between the two objects may be above a threshold proximity.

In some embodiments, different thresholds may be associated with different confidence and/or severity levels of collision or near-collision. For example, one threshold may be associated with a 50% confidence that a near-collision will occur (e.g., that two objects will approach each other, but will likely not impact each other), another threshold may be associated with a 100% confidence that a near-collision will occur, yet another threshold may be associated with a 75% confidence that a collision will occur (e.g., that two objects will collide with each other), and so on. In some embodiments, different collision prevention measures may be associated with different confidence and/or severity levels of collision or near-collision.

Process 1000 may further include identifying (at 1010) a potential collision when identifying a rare data set or feature in the relationship data. In some embodiments, as noted above, the potential collision may be identified for rare features that meet other thresholds (e.g., less than a maximum proximity, greater than a minimum relative speed, etc.).

Process 1000 may additionally include causing (at 1012) vehicle 103 to enact one or more collision prevention measures based on the identified collision. For example, as discussed above, vehicle 103 may swerve, brake, output one or more alerts (e.g., via a display screen, speaker, etc.). In some embodiments, the particular type of collision prevention measure may be determined based on sensor data, relationship data, or the like, associated with vehicle 103. For example, in situations where vehicle 103 is directly behind an object, vehicle 103 may brake. As another example, in situations where vehicle 103 is approaching the object at an angle, vehicle 103 may swerve to avoid the object. As noted above, the confidence and/or severity of a given collision or near-collision (e.g., based on one or more thresholds, as discussed above) may be associated with different collision prevention measures. For example, a 100% confidence of a collision may be associated with a braking collision prevention measure and an alert collision prevention measure, while a 50% confidence of a near-collision may be associated with an alert collision prevention measure but not a braking or swerving collision prevention measure.

In some embodiments, some or all of process 1000 may be repeated iteratively and/or on an ongoing basis. For example, when a potential collision is not identified (e.g., at 1008—NO), vehicle 103 may refrain from performing one or more collision prevention measures, and may continue to receive, monitor, etc. relationship data between vehicle 103 and one or more objects.

Figure 11:
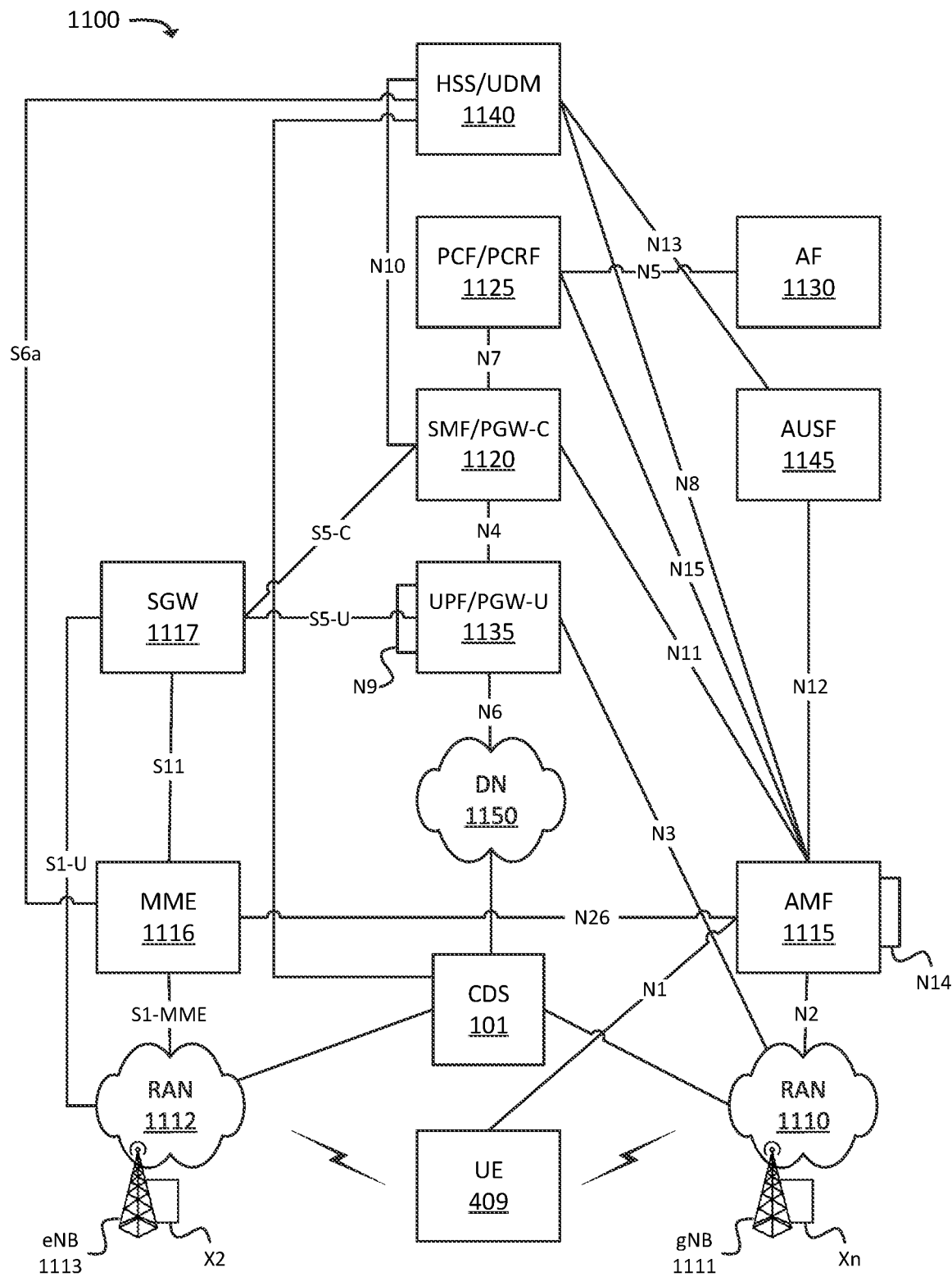
FIG. 11 illustrates an example environment in which one or more embodiments, described herein, may be implemented.

FIG. 11 illustrates an example environment 1100, in which one or more embodiments may be implemented. In some embodiments, environment 1100 may correspond to a Fifth Generation ("5G") network, and/or may include elements of a 5G network. In some embodiments, environment 1100 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1100 may include UE 409, RAN 1110 (which may include one or more Next Generation Node Bs ("gNBs") 1111), RAN 1112 (which may include one or more one or more evolved Node Bs ("eNBs") 1113), and various network functions such as Access and Mobility Management Function ("AMF") 1115, Mobility Management Entity ("MME") 1116, Serving Gateway ("SGW") 1117, Session Management Function ("SMF")/Packet Data Network ("PDN") Gateway ("PGW")-Control plane function ("PGW-C") 1120, Policy Control Function ("PCF")/Policy Charging and Rules Function ("PCRF") 1125, Application Function ("AF") 1130, User Plane Function ("UPF")/PGW-User plane function ("PGW-U") 1135, Home Subscriber Server ("HSS")/Unified Data Management ("UDM") 1140, and Authentication Server Function ("AUSF") 1145. Environment 1100 may also include one or more networks, such as Data Network ("DN") 1150. Environment 1100 may include one or more additional devices or systems communicatively coupled to one or more networks (e.g., DN 1150), such as collision detection system 101.

The example shown in FIG. 11 illustrates one instance of each network component or function (e.g., one instance of SMF/PGW-C 1120, PCF/PCRF 1125, UPF/PGW-U 1135, HSS/UDM 1140, and/or 1145). In practice, environment 1100 may include multiple instances of such components or functions. For example, in some embodiments, environment 1100 may include multiple "slices" of a core network, where each slice includes a discrete set of network functions (e.g., one slice may include a first instance of SMF/PGW-C 1120, PCF/PCRF 1125, UPF/PGW-U 1135, HSS/UDM 1140, and/or 1145, while another slice may include a second instance of SMF/PGW-C 1120, PCF/PCRF 1125, UPF/PGW-U 1135, HSS/UDM 1140, and/or 1145). The different slices may provide differentiated levels of service, such as service in accordance with different Quality of Service ("QoS") parameters.

The quantity of devices and/or networks, illustrated in FIG. 11, is provided for explanatory purposes only. In practice, environment 1100 may include additional devices and/or networks, fewer devices and/or networks, different devices and/or networks, or differently arranged devices and/or networks than illustrated in FIG. 11. For example, while not shown, environment 1100 may include devices that facilitate or enable communication between various components shown in environment 1100, such as routers, modems, gateways, switches, hubs, etc. Alternatively, or additionally, one or more of the devices of environment 1100 may perform one or more network functions described as being performed by another one or more of the devices of environment 1100. Devices of environment 1100 may interconnect with each other and/or other devices via wired connections, wireless connections, or a combination of wired and wireless connections. In some implementations, one or more devices of environment 1100 may be physically integrated in, and/or may be physically attached to, one or more other devices of environment 1100.

UE 409 may include a computation and communication device, such as a wireless mobile communication device that is capable of communicating with RAN 1110, RAN 1112, and/or DN 1150. UE 409 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 409 may send traffic to and/or receive traffic (e.g., user plane traffic) from DN 1150 via RAN 1110, RAN 1112, and/or UPF/PGW-U 1135. In some embodiments, UE 409 may be communicatively coupled to, and/or may be incorporated in, one or more vehicles 103.

RAN 1110 may be, or may include, a 5G RAN that includes one or more base stations (e.g., one or more gNBs 1111), via which UE 409 may communicate with one or more other elements of environment 1100. UE 409 may communicate with RAN 1110 via an air interface (e.g., as provided by gNB 1111). For instance, RAN 1110 may receive traffic (e.g., voice call traffic, data traffic, messaging traffic, signaling traffic, etc.) from UE 409 via the air interface, and may communicate the traffic to UPF/PGW-U 1135, and/or one or more other devices or networks. Similarly, RAN 1110 may receive traffic intended for UE 409 (e.g., from UPF/PGW-U 1135, AMF 1115, and/or one or more other devices or networks) and may communicate the traffic to UE 409 via the air interface.

RAN 1112 may be, or may include, a LTE RAN that includes one or more base stations (e.g., one or more eNBs 1113), via which UE 409 may communicate with one or more other elements of environment 1100. UE 409 may communicate with RAN 1112 via an air interface (e.g., as provided by eNB 1113). For instance, RAN 1110 may receive traffic (e.g., voice call traffic, data traffic, messaging traffic, signaling traffic, etc.) from UE 409 via the air interface, and may communicate the traffic to UPF/PGW-U 1135, and/or one or more other devices or networks. Similarly, RAN 1110 may receive traffic intended for UE 409 (e.g., from UPF/PGW-U 1135, SGW 1117, and/or one or more other devices or networks) and may communicate the traffic to UE 409 via the air interface.

AMF 1115 may include one or more devices, systems, Virtualized Network Functions ("VNFs"), etc., that perform operations to register UE 409 with the 5G network, to establish bearer channels associated with a session with UE 409, to hand off UE 409 from the 5G network to another network, to hand off UE 409 from the other network to the 5G network, manage mobility of UE 409 between RANs 1110 and/or gNBs 1111, and/or to perform other operations. In some embodiments, the 5G network may include multiple AMFs 1115, which communicate with each other via the N14 interface (denoted in FIG. 11 by the line marked "N14" originating and terminating at AMF 1115).

MME 1116 may include one or more devices, systems, VNFs, etc., that perform operations to register UE 409 with the EPC, to establish bearer channels associated with a session with UE 409, to hand off UE 409 from the EPC to another network, to hand off UE 409 from another network to the EPC, manage mobility of UE 409 between RANs 1112 and/or eNBs 1113, and/or to perform other operations.

SGW 1117 may include one or more devices, systems, VNFs, etc., that aggregate traffic received from one or more eNBs 1113 and send the aggregated traffic to an external network or device via UPF/PGW-U 1135. Additionally, SGW 1117 may aggregate traffic received from one or more UPF/PGW-Us 1135 and may send the aggregated traffic to one or more eNBs 1113. SGW 1117 may operate as an anchor for the user plane during inter-eNB handovers and as an anchor for mobility between different telecommunication networks or RANs (e.g., RANs 1110 and 1112).

SMF/PGW-C 1120 may include one or more devices, systems, VNFs, etc., that gather, process, store, and/or provide information in a manner described herein. SMF/PGW-C 1120 may, for example, facilitate the establishment of communication sessions on behalf of UE 409. In some embodiments, the establishment of communications sessions may be performed in accordance with one or more policies provided by PCF/PCRF 1125.

PCF/PCRF 1125 may include one or more devices, systems, VNFs, etc., that aggregate information to and from the 5G network and/or other sources. PCF/PCRF 1125 may receive information regarding policies and/or subscriptions from one or more sources, such as subscriber databases and/or from one or more users (such as, for example, an administrator associated with PCF/PCRF 1125).

AF 1130 may include one or more devices, systems, VNFs, etc., that receive, store, and/or provide information that may be used in determining parameters (e.g., quality of service parameters, charging parameters, or the like) for certain applications.

UPF/PGW-U 1135 may include one or more devices, systems, VNFs, etc., that receive, store, and/or provide data (e.g., user plane data). For example, UPF/PGW-U 1135 may receive user plane data (e.g., voice call traffic, data traffic, etc.), destined for UE 409, from DN 1150, and may forward the user plane data toward UE 409 (e.g., via RAN 1110, SMF/PGW-C 1120, and/or one or more other devices). In some embodiments, multiple UPFs 1135 may be deployed (e.g., in different geographical locations), and the delivery of content to UE 409 may be coordinated via the N9 interface (e.g., as denoted in FIG. 11 by the line marked "N9" originating and terminating at UPF/PGW-U 1135). Similarly, UPF/PGW-U 1135 may receive traffic from UE 409 (e.g., via RAN 1110, SMF/PGW-C 1120, and/or one or more other devices), and may forward the traffic toward DN 1150. In some embodiments, UPF/PGW-U 1135 may communicate (e.g., via the N4 interface) with SMF/PGW-C 1120, regarding user plane data processed by UPF/PGW-U 1135.

HSS/UDM 1140 and AUSF 1145 may include one or more devices, systems, VNFs, etc., that manage, update, and/or store, in one or more memory devices associated with AUSF 1145 and/or HSS/UDM 1140, profile information associated with a subscriber. AUSF 1145 and/or HSS/UDM 1140 may perform authentication, authorization, and/or accounting operations associated with the subscriber and/or a communication session with UE 409.

DN 1150 may include one or more wired and/or wireless networks. For example, DN 1150 may include an Internet Protocol ("IP")-based PDN, a wide area network ("WAN") such as the Internet, a private enterprise network, and/or one or more other networks. UE 409 may communicate, through DN 1150, with data servers, other UEs 409, and/or to other servers or applications that are coupled to DN 1150. DN 1150 may be connected to one or more other networks, such as a public switched telephone network ("PSTN"), a public land mobile network ("PLMN"), and/or another network. DN 1150 may be connected to one or more devices, such as content providers, applications, web servers, and/or other devices, with which UE 409 may communicate.

Collision detection system 101 may include one or more devices, systems, VNFs, that perform one or more operations described herein. For example, collision detection system 101 may generate one or more collision models 415 based on relationship data associated with multiple objects (e.g., based on camera data 401, vehicle sensor data 403, UE sensor data 405, etc.). Collision detection system 101 may output collision models 415 to one or more devices or systems (e.g., UEs 409, vehicles 103, etc.), which may utilize the models to identify and avoid potential collisions. In some embodiments, collision detection system 101 may receive (e.g., in real time or near-real time) sensor data, relationship data, and/or other data associated with one or more vehicles 103, analyze the data, and detect potential collisions based on the analysis. In some embodiments, collision detection system 101 may output alerts to vehicles 103 for which potential collisions have been identified, such that vehicles 103 may select and/or take appropriate collision avoidance measures.

Figure 12:
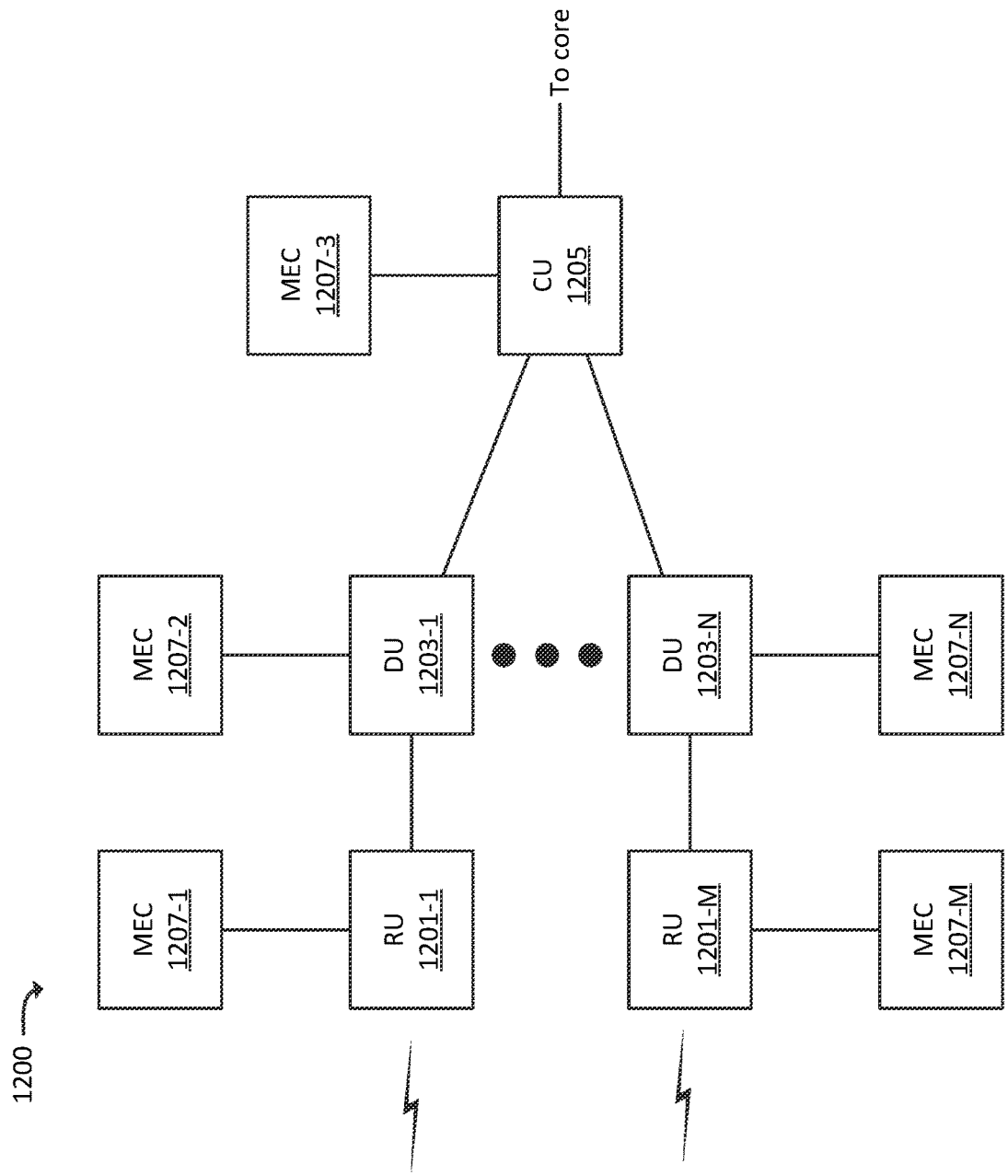
FIG. 12 illustrates an example arrangement of a radio access network ("RAN"), in accordance with some embodiments.

FIG. 12 illustrates an example Distributed Unit ("DU") network 1200, which may be included in and/or implemented by one or more RANs (e.g., RAN 1110, RAN 1112, or some other RAN). In some embodiments, a particular RAN may include one DU network 1200. In some embodiments, a particular RAN may include multiple DU networks 1200. In some embodiments, DU network 1200 may correspond to a particular gNB 1111 of a 5G RAN (e.g., RAN 1110). In some embodiments, DU network 1200 may correspond to multiple gNBs 1111. In some embodiments, DU network 1200 may correspond to one or more other types of base stations of one or more other types of RANs. As shown, DU network 1200 may include Central Unit ("CU") 1205, one or more Distributed Units ("DUs") 1203-1 through 1203-N (referred to individually as "DU 1203," or collectively as "DUs 1203"), and one or more Radio Units ("RUs") 1201-1 through 1201-M (referred to individually as "RU 1201," or collectively as "RUs 1201").

CU 1205 may communicate with a core of a wireless network (e.g., may communicate with one or more of the devices or systems described above with respect to FIG. 11, such as AMF 1115 and/or UPF/PGW-U 1135). In the uplink direction (e.g., for traffic from UEs 409 to a core network), CU 1205 may aggregate traffic from DUs 1203, and forward the aggregated traffic to the core network. In some embodiments, CU 1205 may receive traffic according to a given protocol (e.g., Radio Link Control ("RLC")) from DUs 1203, and may perform higher-layer processing (e.g., may aggregate/process RLC packets and generate Packet Data Convergence Protocol ("PDCP") packets based on the RLC packets) on the traffic received from DUs 1203.

In accordance with some embodiments, CU 1205 may receive downlink traffic (e.g., traffic from the core network) for a particular UE 409, and may determine which DU(s) 1203 should receive the downlink traffic. DU 1203 may include one or more devices that transmit traffic between a core network (e.g., via CU 1205) and UE 409 (e.g., via a respective RU 1201). DU 1203 may, for example, receive traffic from RU 1201 at a first layer (e.g., physical ("PHY") layer traffic, or lower PHY layer traffic), and may process/aggregate the traffic to a second layer (e.g., upper PHY and/or RLC). DU 1203 may receive traffic from CU 1205 at the second layer, may process the traffic to the first layer, and provide the processed traffic to a respective RU 1201 for transmission to UE 409.

RU 1201 may include hardware circuitry (e.g., one or more RF transceivers, antennas, radios, and/or other suitable hardware) to communicate wirelessly (e.g., via an RF interface) with one or more UEs 409, one or more other DUs 1203 (e.g., via RUs 1201 associated with DUs 1203), and/or any other suitable type of device. In the uplink direction, RU 1201 may receive traffic from UE 409 and/or another DU 1203 via the RF interface and may provide the traffic to DU 1203. In the downlink direction, RU 1201 may receive traffic from DU 1203, and may provide the traffic to UE 409 and/or another DU 1203.

RUs 1201 may, in some embodiments, be communicatively coupled to one or more Multi-Access/Mobile Edge Computing ("MEC") devices, referred to sometimes herein simply as "MECs" 1207. For example, RU 1201-1 may be communicatively coupled to MEC 1207-1, RU 1201-M may be communicatively coupled to MEC 1207-M, DU 1203-1 may be communicatively coupled to MEC 1207-2, DU 1203-N may be communicatively coupled to MEC 1207-N, CU 1205 may be communicatively coupled to MEC 1207-3, and so on. MECs 1207 may include hardware resources (e.g., configurable or provisionable hardware resources) that may be configured to provide services and/or otherwise process traffic to and/or from UE 409, via a respective RU 1201.

For example, RU 1201-1 may route some traffic, from UE 409, to MEC 1207-1 instead of to a core network (e.g., via DU 1203 and CU 1205). MEC 1207-1 may process the traffic, perform one or more computations based on the received traffic, and may provide traffic to UE 409 via RU 1201-1. In this manner, ultra-low latency services may be provided to UE 409, as traffic does not need to traverse DU 1203, CU 1205, and an intervening backhaul network between DU network 1200 and the core network. In some embodiments, MEC 1207 may include, and/or may implement, some or all of the functionality described above with respect to collision detection system 101.

Figure 13:
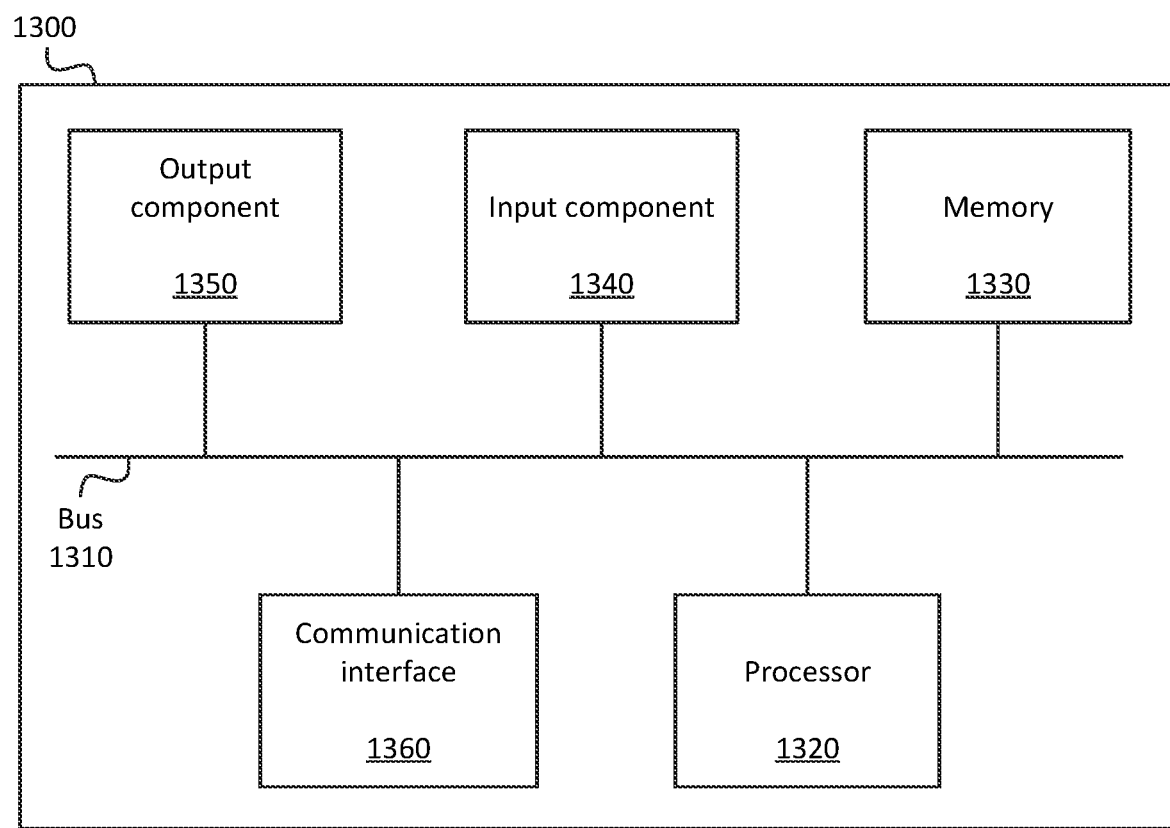
FIG. 13 illustrates example components of one or more devices, in accordance with one or more embodiments described herein.

FIG. 13 illustrates example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300 and/or other receives or detects input from a source external to 1340, such as a touchpad, a touchscreen, a keyboard, a keypad, a button, a switch, a microphone or other audio input component, etc. In some embodiments, input component 1340 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-11), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
identify a plurality of data sets that are each associated with a plurality of dimensions, wherein each dimension of the plurality of dimensions is based on a particular factor indicating relationship data between multiple objects;
perform an anomaly detection technique on the plurality of data sets to identify a subset of the plurality of data sets that are rare data sets with respect to the plurality of data sets;
determine a rarity threshold curve, associated with the plurality of dimensions, based on identifying the subset of the plurality of data sets, wherein the rarity threshold curve separates the rare data sets from data sets, of the plurality of data sets, that are not rare;
receive a particular data set indicating particular relationship data between a particular vehicle and a particular object detected by one or more sensors associated with the particular vehicle;
compare the particular data set, associated with the particular vehicle and the particular object, with the rarity threshold curve;
determine, based on the comparison, whether the particular data set associated with the particular vehicle and the particular object is a rare data set;
when the particular data set associated with the particular vehicle and the particular object is not a rare data set, refrain from causing the particular vehicle to perform a collision prevention measure; and
when the particular data set associated with the particular vehicle and the particular object is a rare data set, cause the particular vehicle to perform the collision prevention measure.

2. The device of claim 1, wherein the relationship data between the multiple objects includes at least two of:
a difference in speed between two objects,
a proximity between the two objects,
a difference in acceleration between the two objects, and
an angle between the two objects.

3. The device of claim 1, wherein the rarity threshold curve is determined based on a density of the data sets, of the plurality of data sets.

4. The device of claim 1, wherein the collision prevention measure includes at least one of:
swerving,
braking, or
outputting an alert via an alert output system associated with the particular vehicle.

5. The device of claim 1, wherein the plurality of data sets are associated with a particular model of a plurality of models that are associated with a plurality of different locale attributes, wherein the one or more processors are further configured to:
identify locale attributes associated with the particular vehicle and the particular object;
compare the locale attributes, associated with the particular vehicle and the particular object, to the locale attributes associated with the plurality of models; and
select the particular model from the plurality of models based on the comparing of the locale attributes.

6. The device of claim 1, wherein the anomaly detection technique includes at least one of:
a Density-Based Spatial Clustering of Applications with Noise ("DBSCAN") analysis of the plurality of data sets,
a Support Vector Machines ("SVM") analysis of the plurality of data sets, or
a Dynamic Programming-based K-Means ("DP KMeans") analysis of the plurality of data sets.

7. The device of claim 1, wherein the rarity threshold forms one or more data bounds, wherein the rare data sets are within a particular data bound of the one or more data bounds.

8. A non-transitory computer-readable medium, storing a plurality of processor-executable instructions to:
identify a plurality of data sets that are each associated with a plurality of dimensions, wherein each dimension of the plurality of dimensions is based on a particular factor indicating relationship data between multiple objects;

perform an anomaly detection technique on the plurality of data sets to identify a subset of the plurality of data sets that are rare data sets with respect to the plurality of data sets;

determine a rarity threshold curve, associated with the plurality of dimensions, based on identifying the subset of the plurality of data sets, wherein the rarity threshold curve separates the rare data sets from data sets, of the plurality of data sets, that are not rare;

receive a particular data set indicating particular relationship data between a particular vehicle and a particular object detected by one or more sensors associated with the particular vehicle;

compare the particular data set, associated with the particular vehicle and the particular object, with the rarity threshold curve;

determine, based on the comparison, whether the particular data set associated with the particular vehicle and the particular object is a rare data set;

when the particular data set associated with the particular vehicle and the particular object is not a rare data set, refrain from causing the particular vehicle to perform a collision prevention measure; and when the particular data set associated with the particular vehicle and the particular object is a rare data set, cause the particular vehicle to perform the collision prevention measure.

9. The non-transitory computer-readable medium of claim 8, wherein the relationship data between the multiple objects includes at least two of:
a difference in speed between two objects,
a proximity between the two objects,
a difference in acceleration between the two objects, and
an angle between the two objects.

10. The non-transitory computer-readable medium of claim 8, wherein the rarity threshold curve is determined based on a density of the data sets, of the plurality of data sets.

11. The non-transitory computer-readable medium of claim 8, wherein the collision prevention measure includes at least one of:
swerving,
braking, or
outputting an alert via an alert output system associated with the particular vehicle.

12. The non-transitory computer-readable medium of claim 8, wherein the plurality of data sets are associated with a particular model of a plurality of models that are associated with a plurality of different locale attributes, wherein the plurality of processor-executable instructions further include processor-executable instructions to:
identify locale attributes associated with the particular vehicle and the particular object;
compare the locale attributes, associated with the particular vehicle and the particular object, to the locale attributes associated with the plurality of models; and
select the particular model from the plurality of models based on the comparing of the locale attributes.

13. The non-transitory computer-readable medium of claim 8, wherein the anomaly detection technique includes at least one of:
a Density-Based Spatial Clustering of Applications with Noise ("DBSCAN") analysis of the plurality of data sets,
a Support Vector Machines ("SVM") analysis of the plurality of data sets, or
a Dynamic Programming-based K-Means ("DP KMeans") analysis of the plurality of data sets.

14. The non-transitory computer-readable medium of claim 8, wherein the rarity threshold forms one or more data bounds, wherein the rare data sets are within a particular data bound of the one or more data bounds.

15. A method, comprising:
identifying a plurality of data sets that are each associated with a plurality of dimensions, wherein each dimension of the plurality of dimensions is based on a particular factor indicating relationship data between multiple objects;

performing an anomaly detection technique on the plurality of data sets to identify a subset of the plurality of data sets that are rare data sets with respect to the plurality of data sets;

determining a rarity threshold curve, associated with the plurality of dimensions, based on identifying the subset of the plurality of data sets, wherein the rarity threshold curve separates the rare data sets from data sets, of the plurality of data sets, that are not rare;

receiving a particular data set indicating particular relationship data between a particular vehicle and a particular object detected by one or more sensors associated with the particular vehicle;

comparing the particular data set, associated with the particular vehicle and the particular object, with the rarity threshold curve;

determining, based on the comparison, whether the particular data set associated with the particular vehicle and the particular object is a rare data set;

when the particular data set associated with the particular vehicle and the particular object is not a rare data set, refraining from causing the particular vehicle to perform a collision prevention measure; and when the particular data set associated with the particular vehicle and the particular object is a rare data set, causing the particular vehicle to perform the collision prevention measure.

16. The method of claim 15, wherein the relationship data between the multiple objects includes at least two of:
a difference in speed between two objects,
a proximity between the two objects,
a difference in acceleration between the two objects, and
an angle between the two objects.

17. The method of claim 15, wherein the rarity threshold curve is determined based on a density of the data sets, of the plurality of data sets.

18. The method of claim 15, wherein the plurality of data sets are associated with a particular model of a plurality of models that are associated with a plurality of different locale attributes, the method further comprising:
identifying locale attributes associated with the particular vehicle and the particular object;
comparing the locale attributes, associated with the particular vehicle and the particular object, to the locale attributes associated with the plurality of models; and
selecting the particular model from the plurality of models based on the comparing the locale attributes.

19. The method of claim 15, wherein the anomaly detection technique includes at least one of:
a Density-Based Spatial Clustering of Applications with Noise ("DBSCAN") analysis of the plurality of data sets, a Support Vector Machines ("SVM") analysis of the plurality of data sets, or a Dynamic Programming-based K-Means ("DP KMeans") analysis of the plurality of data sets.

20. The method of claim 15, wherein the rarity threshold forms one or more data bounds, wherein the rare data sets are within a particular data bound of the one or more data bounds.

\* \* \* \* \*